US012688818B2

(12) United States Patent
Furihata et al.

(10) Patent No.: US 12,688,818 B2
(45) Date of Patent: Jul. 21, 2026

(54) DEVICE AND METHOD FOR CONTROLLING BACKLIGHT LIGHT SOURCES

(71) Applicant: Synaptics Incorporated, San Jose, CA (US)

(72) Inventors: Hirobumi Furihata, Tokyo (JP); Takashi Nose, Kanagawa (JP); Masao Orio, Tokyo (JP); Kei Miyazawa, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/919,976

(22) Filed: Oct. 18, 2024

(65) Prior Publication Data

US 2026/0112303 A1 Apr. 23, 2026

(51) Int. Cl.
*G09G 3/32* (2016.01)

(52) U.S. Cl.
CPC ......... *G09G 3/32* (2013.01); *G09G 2310/062* (2013.01); *G09G 2310/08* (2013.01); *G09G 2320/0646* (2013.01); *G09G 2370/20* (2013.01)

(58) Field of Classification Search
CPC ................... G09G 2320/0646; G09G 2370/20
See application file for complete search history.

(56) References Cited

U.S. PATENT DOCUMENTS

2007/0236423 A1* 10/2007 Chiou .................. G09G 3/3283 345/76
2010/0134404 A1 6/2010 Tsuchida et al.
2017/0264364 A1* 9/2017 Aoyama ............ H04B 10/1141
2020/0090608 A1 3/2020 Calayir et al.
2020/0160796 A1 5/2020 Ahn et al.
2021/0081159 A1* 3/2021 Kaneko ................. G06F 3/1446
2022/0415272 A1* 12/2022 Xiong .................. G09G 3/3426
(Continued)

FOREIGN PATENT DOCUMENTS

JP 2010249996 A 11/2010

OTHER PUBLICATIONS

International Search Report, dated Feb. 2, 2026, in international patent application No. PCT/US2025/049617.

*Primary Examiner* — Bipin Gyawali
(74) *Attorney, Agent, or Firm* — Leydig, Voit & Mayer, Ltd.

(57) ABSTRACT

A display device includes a plurality of light sources, a plurality of display driver integrated circuits (DDICs), and a light source driver. The light sources are configured to illuminate a display panel comprising a plurality of regions. Each DDIC is configured to generate backlighting data for a respective region of the plurality of regions. The backlighting data is indicative of luminance levels of respective light sources, of the plurality of light sources, which correspond to the respective region of the plurality of regions. Each DDIC is further configured to store ordering information indicative of an order for outputting the backlighting data, and output the backlighting data for the respective region based on the ordering information and a backlighting data synchronization signal. The light source driver is configured to drive the plurality of light sources based on the backlighting data for the plurality of regions output from the plurality of DDICs.

17 Claims, 16 Drawing Sheets

(56) References Cited

U.S. PATENT DOCUMENTS

| | | | | |
|---|---|---|---|---|
| 2023/0154421 | A1* | 5/2023 | Leong | G09G 3/3426 345/691 |
| 2024/0231152 | A1 | 7/2024 | Du et al. | |
| 2024/0339186 | A1* | 10/2024 | Sakayori | G16H 30/40 |
| 2025/0087173 | A1* | 3/2025 | Zhao | G09G 3/3426 |

* cited by examiner

DEVICE AND METHOD FOR CONTROLLING BACKLIGHT LIGHT SOURCES

TECHNICAL FIELD

This disclosure relates generally to panel display devices and more particularly to controlling backlight light sources that illuminate a display panel.

BACKGROUND

Display devices with light-transmissive display panels, such as light-transmissive liquid crystal display (LCD) panels, may include backlights that illuminate the light-transmissive display panels. Modern backlighting systems (e.g., direct-lit backlighting, full array backlighting etc.) may illuminate a display panel with a two-dimensional (2D) array of light sources (e.g., light emitting diodes (LEDs)) located behind the display panel, which may be configured to illuminate respective zones of the display panel. The use of a 2D array of light sources in a backlight device enables the implementation of a local dimming function, a technique for achieving high dynamic contrast and low power consumption by individually controlling each light source of the 2D light source array in accordance with input image data.

SUMMARY

This summary is provided for the purpose of introducing, in a simplified form, a selection of concepts that will be further described below. This summary is not necessarily intended to identify key features or essential features of the present disclosure. The present disclosure may include the following various aspects and embodiments.

In one aspect, the present disclosure provides a display device that includes a plurality of light sources, a plurality of display driver integrated circuits (DDICs), and a light source driver. The plurality of light sources are configured to illuminate a display panel having a plurality of regions. Each of the plurality of DDICs is configured to generate backlighting data for a respective region of the plurality of regions. The backlighting data is indicative of luminance levels of respective light sources, of the plurality of light sources, which correspond to the respective region. Each of the plurality of DDICs is further configured to store ordering information indicative of an order for outputting the backlighting data, and to output the backlighting data for the respective region based on the ordering information and a backlighting data synchronization signal. The light source driver is configured to drive the plurality of light sources based on the backlighting data for the plurality of regions output from the plurality of DDICs.

In another aspect, the present disclosure provides a display driver integrated circuit that includes a drive circuit, a local dimming processing circuit, and a backlighting data transfer circuit. The drive circuit is configured to drive a region of a display panel having a plurality of regions. The local dimming processing circuit is configured to generate backlighting data for the region of the display panel. The backlighting data is indicative of luminance levels of respective light sources corresponding to the region of the display panel. The backlighting data transfer circuit is configured to store ordering information indicative of an order for outputting the backlighting data and receive a backlighting data synchronization signal from an entity external to the display driver integrated circuit. The backlighting data transfer circuit is further configured to output the backlighting data based on the ordering information and the backlighting data synchronization signal to control the luminance levels of the respective light sources.

In yet another aspect, the present disclosure provides a method of operating a display device, the method includes illuminating a display panel with a plurality of light sources. The display panel includes a plurality of regions. The method further includes generating, by each display driver integrated circuit (DDIC) of a plurality of DDICs, backlighting data for a respective region of the plurality of regions. The backlighting data for the respective region is indicative of luminance levels of respective light sources, of the plurality of light sources, which correspond to the respective region. The method further includes storing, by each of the plurality of DDICs, ordering information indicative of an order for outputting the backlighting data. The method further includes outputting, by each of the plurality of DDICs, the backlighting data generated by the respective DDIC based on the ordering information and a backlighting data synchronization signal. The method further includes driving the plurality of light sources based on the backlighting data for the plurality of regions output from the plurality of DDICs.

Other features and aspects are described in more detail below with reference to the attached drawings.

Figure 1:
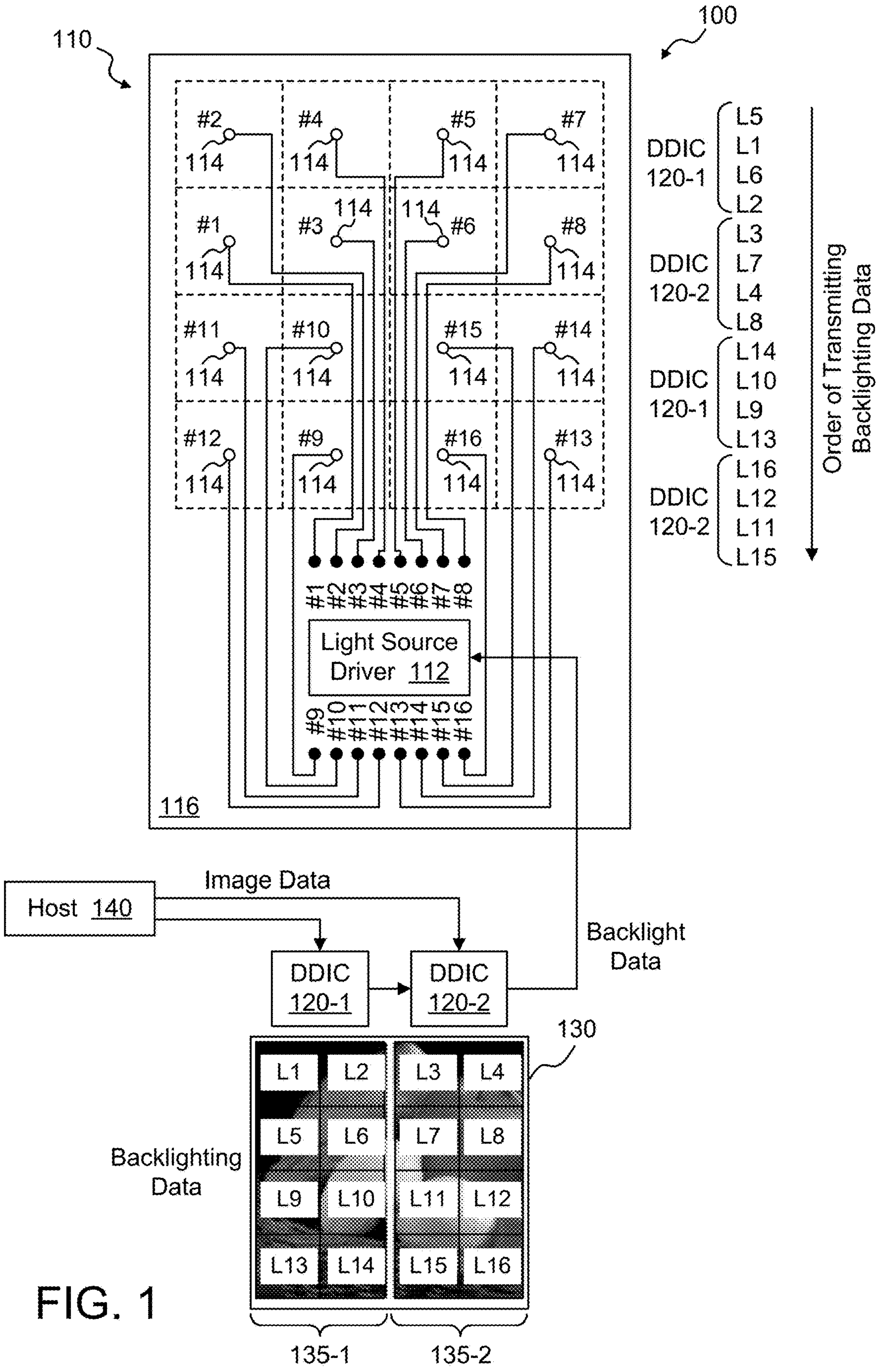
FIG. 1 shows an example configuration of a display device, according to one or more examples of the present disclosure.

For ease of understanding, where possible, identical reference numerals have been used to designate elements that are common to the figures. It is contemplated that elements disclosed in one embodiment may be utilized in other embodiments without specific recitation. Suffixes may be appended to reference numerals to distinguish elements from one another. The drawings referenced herein are not to be construed as being drawn to scale unless specifically noted. In addition, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the applications and uses of the disclosure. Further, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Panel display devices may be configured to illuminate a display panel with a backlight device that includes a two-dimensional (2D) array of light sources (e.g., light emitting diodes (LEDs)). Such panel display devices may be configured to implement a local dimming function that individually controls the luminance levels of the respective light sources based on input image data representing an input image to be displayed on the display panel. The use of the local dimming function facilitates the achievement of high dynamic contrast with low power consumption.

A backlight device having a 2D array of light sources may include a light source driver configured to drive the respective light sources. The light source driver may be coupled to the light sources via routing traces and configured to provide drive signals (e.g., drive voltages or drive currents) to the light sources via the routing traces. The light source driver may be configured to generate the drive signals based on backlighting data for the respective light sources, wherein the backlighting data for a light source may be indicative of the desired luminance level of that light source. Although the light source driver is referred to herein in the singular, the light source driver may include one or more driver integrated circuits (ICs), such as one or more LED driver ICs.

In some implementations, the light source driver may be configured to serially receive the backlighting data for the respective light sources in a particular order and to output the drive signals from the output terminals (e.g., the output pins of the IC(s)) determined depending on the order of receiving the backlighting data. The output terminal from which the light source driver outputs the drive signal corresponding to each backlighting data may depend on the order of receiving the backlighting data. For example, a first drive signal corresponding to the backlighting data for a first light source may be provided to the first light source from a first output terminal selected based on the fact that the backlighting data for the first light source is received first by the light source driver in a light source luminance control cycle, and a second drive signal corresponding to backlighting data for a second light source may be provided to the second light source from a second output terminal selected based on the fact that the backlighting data for the second light source is received next by the light source driver. The order of receiving the backlighting data for the respective light sources may be defined by the specifications of the light source driver to enable the light source driver to control the luminance levels of the light sources coupled to the respective output terminals.

The backlighting data may be generated by a display driver configured to drive the display panel based on image data received from an image source. The received image data may correspond to a display image to be displayed on the display panel and may include grey levels of respective primary colors (e.g., red, green, and blue) of respective pixels of the display image. In such implementations, the display driver may also be configured to generate backlighting data based on the image data.

Meanwhile, especially in implementations where the display panel is large in size (e.g., in automotive applications), the display panel may be driven by multiple display driver integrated circuits (DDICs) implemented on separate semiconductor dies. In this case, each DDIC is responsible for driving a specific region of the display panel. More specifically, each DDIC may be configured to receive input image data for the region for which that DDIC is responsible, rather than for the entire display panel, and to drive the responsible region based on the received input image data. In such implementations, each DDIC may further be configured to generate backlighting data for light sources that illuminate the responsible region of the display data based on the input image data for the responsible region. This configuration may effectively streamline the generation of the backlighting data for the respective light sources, since the input image data provided to each DDIC is used both to drive the display panel and to generate the backlighting data.

The present disclosure however recognizes that generating the backlighting data by multiple DDICs may result in increased hardware and/or lead time for transferring the backlighting data for the respective light sources to the light source driver in an order that allows the light source driver to drive the desired light sources in accordance with the backlighting data. One approach may be to collect the generated backlighting data from the respective DDICs at a particular one of the DDICs, which may be referred to hereinafter as a master DDIC, and to sort the collected backlighting data in the order in which the backlighting data is to be transferred to the light source driver. This approach may however result in inefficient use of memory in one or more DDICs other than the master DDIC. The DDICs used to drive the display panel may have the same configuration for efficient manufacturing. In such implementations, all DDICs may be configured to have memory capacity to store the backlighting data for all light sources. Although the master DDIC may fully utilize the memory capacity to store the backlighting data for all light sources, other DDICs may not, since the other DDICs do not need to store the backlighting data for all light sources. In addition, the collection and sorting of the backlighting data may take a considerable amount of time, which may increase the lead time between the generation of the backlighting data and the transfer of the backlighting data to the light source driver.

FIG. 1 shows an example configuration of a panel display device 100 that includes a backlight device 110, a plurality of DDICs 120, and a display panel 130, according to one or more example of the present disclosure. The display panel 130 may be a light-transmissive display panel, such as an LCD panel. While two DDICs 120-1 and 120-2 are shown in FIG. 1, the panel display device 100 may include three or more DDICs. The DDIC 120-1 is configured to receive image data for a first region 135-1 of the display panel 130 and to drive or update pixels in the first region 135-1 based on the received image data. Correspondingly, the DDIC 120-2 is configured to receive image data for a second region 135-2 of the display panel 130 and to drive or update pixels in the second region 135-2 based on the received image data.

The backlight device 110 includes a light source driver 112 and a 2D array of light sources 114. Although 16 light sources 114 are shown, those skilled in the art would appreciate that the backlight device 110 may include fewer or more than 16 light sources. In the shown embodiment, the light source driver 112 has 16 output pins #1 to #16 coupled to the 16 light sources 114 via routing traces, respectively. In one implementation, the light source driver 112 and the light sources 114 may be mounted on a printed circuit board (PCB) or a printed wiring board (PWB) designated by numeral 116.

The routing traces that couple the light source driver 112 to the light sources 114 may be routed such that the routing traces do not intersect one another to reduce the number of conductive layers of the board 116. When the routing traces do not intersect, the board 116 can have only a single conductive layer. Reducing the number of conductive layers may effectively reduce the cost of the backlight device 110. The assignment of output pins #1 to #16 to the light sources 114 may be determined to facilitate preventing the routing traces from intersecting one another. For example, the light source 114 on the top row and the leftmost column is coupled to output pin #2, and the light source 114 on the second row from the top and the leftmost column is coupled to the output pin #1. In FIG. 1, the light sources 114 are indicated by circles, and the output pins coupled to the respective light sources 114 are indicated by labels "#1" to "#16" next to the circles.

The light source driver 112 is configured to drive the light sources 114 based on backlighting data received from the DDICs 120-1 and 120-2, and the luminance levels of the respective light sources are controlled by the backlighting data. The luminance levels of the respective light sources 114 may be controlled cyclically, and the light source driver 112 may be configured to serially receive backlighting data for the respective light sources 114 in each light source luminance control cycle in an order that causes the light source driver 112 to drive the desired light sources 114. In one implementation, the light source driver 112 is configured to serially receive the backlighting data for the respective light sources 114 in an ascending order of the numbering of the output pins coupled to the light sources 114 in each control cycle. For example, the light source driver 112 may first receive the backlighting data for the light source 114 coupled to output pin #1 in each control cycle, and then receive the backlighting data for the light source 114 coupled to output pin #2. The light source driver 112 may then serially receive the backlighting data for other light sources 114 coupled to other output pins #3 to #16 in the ascending order.

One issue is that the order in which the light source driver 112 receives the backlighting data for the light sources 114 may differ from the raster order of the light source array, due to constraints that the routing traces that couple the light source driver 112 to the respective light sources 114 are to be routed to prevent the routing traces from intersecting. In the embodiment shown in FIG. 1, backlighting data "L5" indicating the luminance level for the light source 114 coupled to the output pin "#1", is first transferred to the light source driver 112, wherein the light source 114 coupled to the output pin "#1" is located in the second row from the top and the leftmost column in the light source array. Subsequently, backlighting data "L1" indicating the luminance level for the light source 114 coupled to the output pin "#2" is transferred to the light source driver 112, wherein the light source 114 coupled to the output pin "#2" is located in the top row and leftmost column in the light source array. In the shown embodiment, the backlighting data "L5", "L1", "L6", "L2", "L3", "L7", "L4", "L8", "L14", "L10", "L9", "L13", "L16", "L12", "L11", and "L15" for the light sources 114 coupled to the output pins #1 to #16, respectively, are serially transferred to the light source driver 112 in this order as shown in FIG. 1, which is different from the raster order of the light source array.

The DDICs 120-1 and 120-2 may be configured to transfer the backlighting data "L1" to "L16" to the light source driver 112 in the order shown in FIG. 1, while the DDICs 120-1 and 120-2 may be configured to generate the backlighting data "L1" to "L16" for the respective light sources 114 in the raster order. In the shown embodiment, the DDIC 120-1 is configured to generate the backlighting data "L1", "L2", "L5", "L6", "L9", "L10", "L13", and "L14" based on the image data for the first region 135-1 of the display panel 130, and the DDIC 120-2 is configured to generate the backlighting data "L3", "L4", "L7", "L8", "L11", "L12", "L15", and "L16" based on the image data for the second region 135-2 of the display panel 130.

One approach to transferring the backlighting data "L1" to "L16" to the light source driver 112 in the order shown in FIG. 1 may be to collect the backlighting data "L1" to "L16" at the DDIC 120-2, which may operate as a master DDIC, and to sort the collected backlighting data in the order shown in FIG. 1. However, as will be understood from the above discussion, this approach may result in an inefficient use of memory in the DDIC 120-1 and/or an increased lead time between the generation and transfer of the backlighting data caused by the collection and sorting of the backlighting data.

In light of the above consideration, the present disclosure provides various techniques for efficiently transferring backlighting data generated by multiple DDICs to a light source driver in an order that allows the light source driver to control the luminance levels of the light sources as desired. Various embodiments of the present disclosure are described in detail below.

Figure 2:
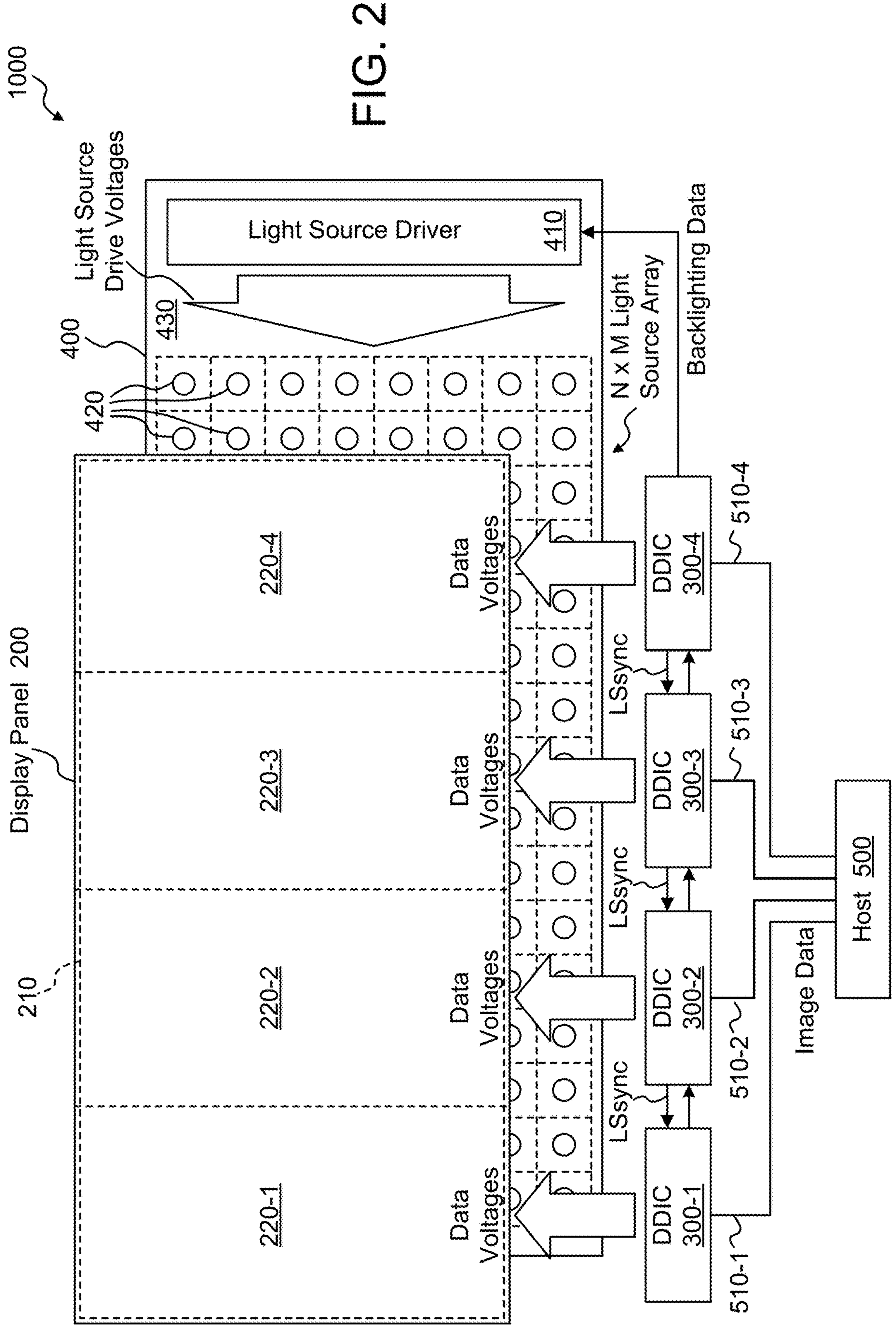
FIG. 2 shows an example configuration of a display device, according to one or more embodiments.

FIG. 2 shows an example configuration of a display device 1000, according to one or more embodiments. The display device 1000 includes a display panel 200, a plurality of DDICs 300, and a backlight device 400. While four DDICs 300-1, 300-2, 300-3, and 300-4 are shown in FIG. 2, the display device 1000 may include two, three, or more than four DDICs. The display panel 200 may be a light-transmissive display panel, such as a light-transmissive LCD panel. The display panel 200 includes an active area 210 in which pixels are arranged to display images. The active area 210 is divided into four regions 220-1, 220-2, 220-3, and 220-4, and the DDICs 300-1, 300-2, 300-3, and 300-4 are configured to drive or update the pixels in the regions 220-1, 220-2, 220-3, and 220-4, respectively, to display a display image on the active area 210.

The backlight device 400 includes a light source driver 410 and an array of light sources 420 configured to illuminate the active area 210 of the display panel 200. The light source driver 410 is configured to drive the light sources 420 based on backlighting data received from the DDICs 300-1, 300-2, 300-3, and 300-4. Each light source 420 may include one or more LEDs, and the light source driver 410 may include one or more LED driver ICs. In the shown embodiment, the light sources 420 are arranged in an N×M matrix or in N rows and M columns, where N and M are each a natural number. In an exemplary embodiment, N may be a natural number that is divisible by the number of the DDICs 300. For example, in the shown embodiment in which the display device 1000 includes four DDICs 300-1 to 300-4, N may be a natural number divisible by four. The light source driver 410 and the array of light sources 420 may be mounted on a circuit board 430, which may be a printed circuit board (PCB) or printed wiring board (PWB). The light source driver 410 may be coupled to the light sources 420 via routing traces (not shown in FIG. 2), which are routed on the circuit board 430 so as not to intersect. This may advantageously reduce the number of conductive layers of the circuit board 430 as discussed above.

Each DDIC **300-*i* is configured to receive image data 510-*i* for the region 220-*i* from a host 500 (e.g., an external controller such as an electronic control unit (ECU), or a processor such as an application processor, a central processing unit (CPU), or a microprocessing unit (MPU)) and to generate data voltages for the respective pixels in the regions 220-*i* based on the image data for the region 220-*i*, where i is any natural number between one and four in the shown embodiment, inclusive, although i can be greater than four depending on the number of regions 220-*i* used. Each DDIC 300-*i* is further configured to drive or update the pixels in the regions 220-*i* with the data voltages generated for the respective pixels. In some embodiments, the image data 510-*i* for the region 220-*i* may include pixel data for the pixels in the region 220-*i*, and the pixel data for a particular pixel of the display panel 200 may include grey levels of the respective primary colors (e.g., red, green, and blue) of that pixel. In such embodiments, the respective DDIC 300 may be configured to drive respective subpixels of that pixel with data voltages corresponding to the grey levels. It should be noted that the host 500 and each DDIC 300 can be point-to-point connected and the host 500 can be configured to provide each of the DDICs 300-1 to 300-4 with the image data for a respective one of the regions 220-1 to 220-4, such that the image data provided to one of the DDICs 300-1 to 300-4 is not provided to the remainder of the DDICs 300-1 to 300-4**.

Figure 3A:
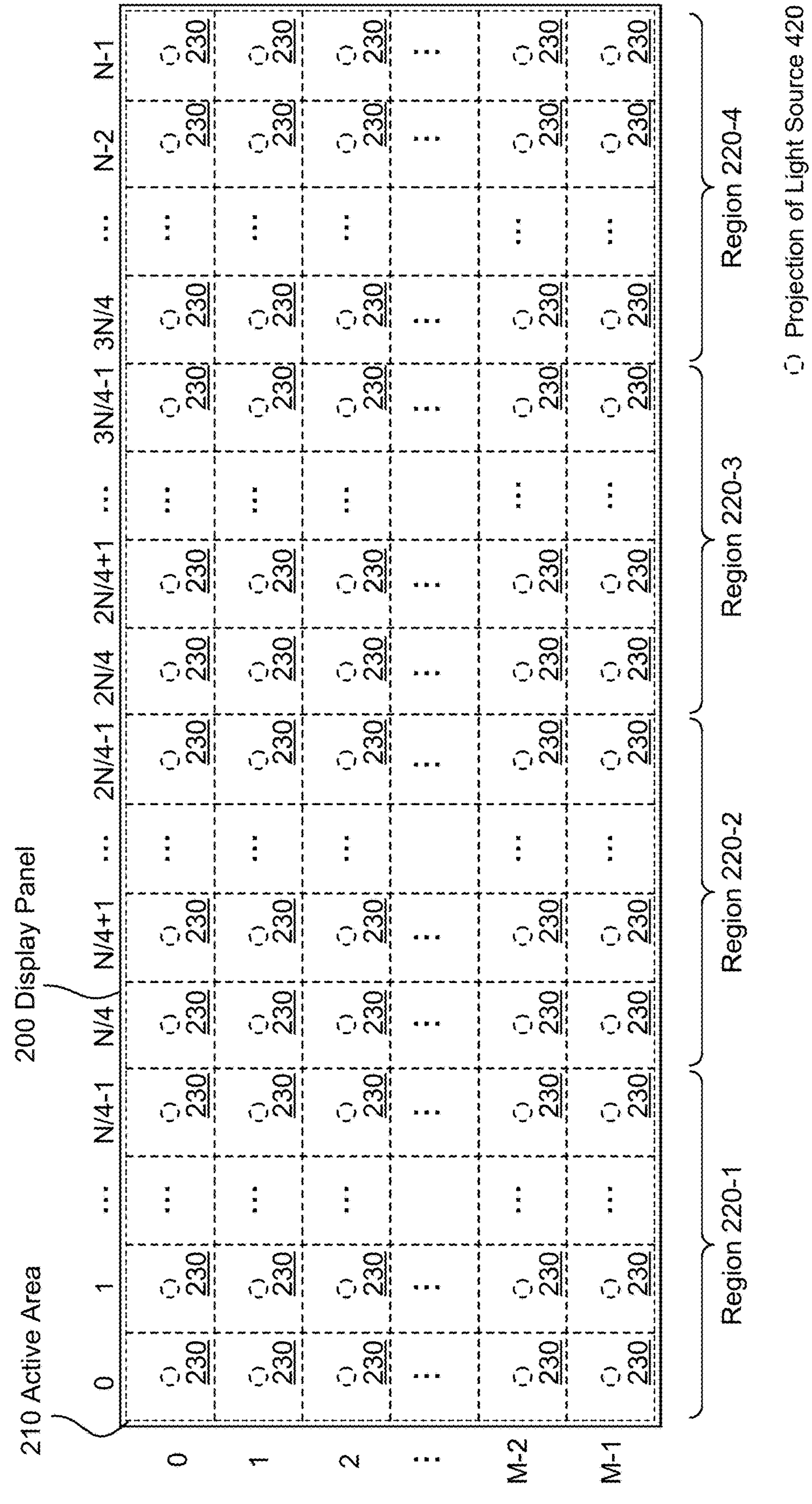
FIG. 3A shows an example of a positional relationship between regions of a display panel and light sources, according to one or more embodiments.

FIG. 3A shows an example of the positional relationship between the regions 220-1 to 220-4 and the light sources 420, according to one or more embodiments. In the shown embodiment, each of the regions 220-1 to 220-4 is divided into an array of subregions 230, with the light sources 420 "corresponding" to the subregions 230, respectively. A particular light source 420 "corresponds" to a particular subregion 230 if the projection of that light source 420 onto the display panel 200 falls within that subregion 230. In FIG. 3A, the projections of the light sources 420 are shown as dotted circles. In embodiments where the light sources 420 are arranged in N rows and M columns, the subregions 230 are also arranged in N rows and M columns. In the shown embodiment, the subregions 230 have a rectangular (e.g., square) shape. Alternatively, the subregions 230 may have a different shape such that the subregions 230 completely cover the active area 210 of the display panel 200. Each subregion 230 is primarily illuminated by the light source 420 corresponding to that subregion 230, and may be secondarily illuminated by the light sources 420 around the corresponding light source 420.

Each DDIC **300-*i* is further configured to generate backlighting data for the light sources 420 that illuminate the region 220-*i*. As discussed above, the backlighting data for a particular light source 420 may indicate the desired luminance level of that light source 420, and the light source driver 410 may be configured to control the luminance level of that light source 420 based on the backlighting data for that light source 420**.

Figure 3B:
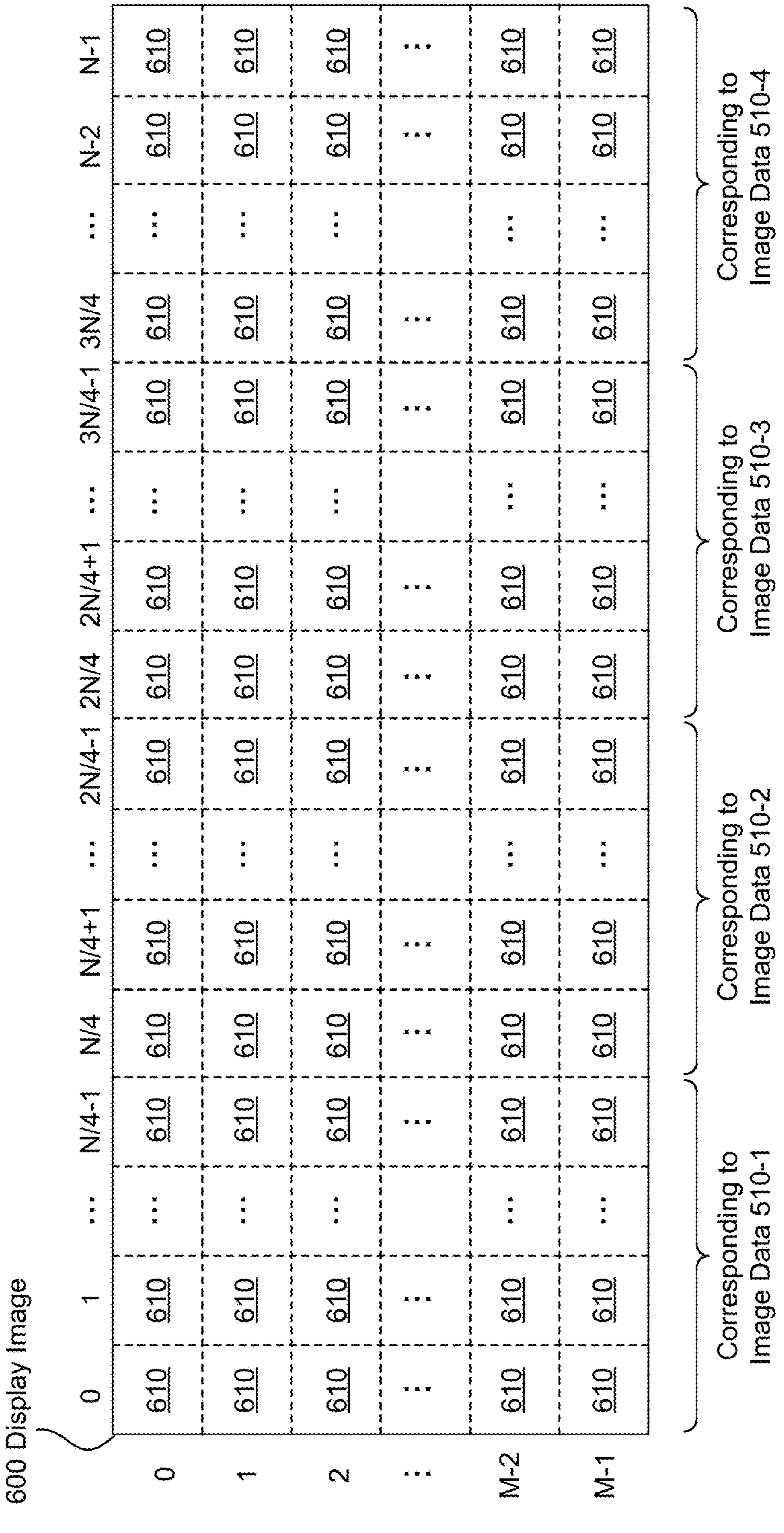
FIG. 3B shows an example definition of zones for a display image, according to one or more embodiments.

In one or more embodiments, the generation of the backlighting data for the respective light sources 420 may be based on "zones" defined for the display image displayed in the active area 210 of the display panel 200. FIG. 3B shows an example definition of the "zones", designated by numeral 610, for the display image, designated by numeral 600, according to one or more embodiments. The zones 610 are defined such that the zones 610 correspond to the respective subregions 230 of the display panel 200. In the shown embodiment, the zones 610 are arranged in N rows and M columns, similar to the subregions 230 of the display panel 200. Each zone 610 of the display image 600 is displayed in the corresponding subregion 230.

In one or more embodiments, the backlighting data for each light source 420 may be generated based on image data for the zone 610 displayed in the subregion 230 corresponding to that light source 420. In some embodiments, the backlighting data for a particular light source 420 corresponding to a particular subregion 230 may be generated based on an average picture level (APL) of the zone 610 of the display image 600 displayed in that subregion 230, wherein the APL of that zone 610 may be generated based on the image data for that zone 610. In other embodiments, generating the backlighting data for a particular light source 420 corresponding to a particular subregion 230 may be accomplished by applying a filter to an image portion that includes the zone 610 displayed in that subregion 230 and its surrounding zones 610 to thereby produce a filtered image portion, and generating the backlighting data for that light source 420 based on the APL of the filtered image portion.

Referring back to FIG. 2, in one or more embodiments, the DDICs 300-1 to 300-4 are connected in series to form a DDIC chain, and the backlighting data generated by the respective DDICs 300-1 to 300-4 is transferred to the light source driver 410 over the chain of the DDICs 300-1 to 300-4. In the shown embodiment, the DDIC 300-1 is configured to transfer the backlighting data generated by the DDIC 300-1 to the light source driver 410 via the DDICs 300-2 to 300-4, the DDIC 300-2 is configured to transfer the backlighting data generated by the DDIC 300-2 to the light source driver 410 via the DDICs 300-3 and 300-4, and the DDIC 300-3 is configured to transfer the backlighting data generated by the DDIC 300-3 to the light source driver 410 via the DDIC 300-4. In alternative embodiments, each of the DDICs 300-1 to 300-4 may be directly coupled to the light source driver 410 and configured to transfer the backlighting data directly to the light source driver 410.

The light source driver 410 is configured to receive the backlighting data for the respective light sources 420 from the DDICs 300-1 to 300-4 in a particular order that corresponds to the operation of the light source driver 410. As discussed in relation to FIG. 1, the order of receiving the backlighting data for the light sources 420 may differ from the raster order due to constraints on the routing of the routing traces that couple the light sources 420 to the light source driver.

To transfer the backlighting data for the respective light sources 420 to the light source driver 410 in the order corresponding to the operation of the light source driver 410, the DDICs 300-1 to 300-4 may be configured as follows. In one or more embodiments, one of the DDICs 300-1 to 300-4, which may be referred to as a master DDIC, is configured to generate a backlighting data synchronization signal LSsync and to provide the backlighting data synchronization signal LSsync to other DDICs 300, which may be referred to as slave DDICs. In the shown embodiment, the DDIC 300-4 operates as the master DDIC to provide the backlighting data synchronization signal LSsync to the DDICs 300-1 to 300-3. Each DDIC **300-*i* is configured to store ordering information indicative of an order for outputting the backlighting data generated by that DDIC 300-*i*. Each DDIC 300-*i* is further configured to output the backlighting data for the light sources 420 that illuminate the region 220-*i* based on the ordering information and the backlighting data synchronization signal LSsync. The output of the backlighting data may be synchronized with the assertions of the backlighting data synchronization signal LSsync. The light source driver 410 is configured to drive the light sources 420 based on the backlighting data output from the DDICs 300-1 to 300-4. By properly setting the ordering information for each of the DDICs 300-1 to 300-4, this configuration allows the backlighting data for the respective light sources 420 to be efficiently transferred to the light source driver 410 in an order that allows the light source driver 410 to control the luminance levels of the light sources 420** as desired.

Figure 4:
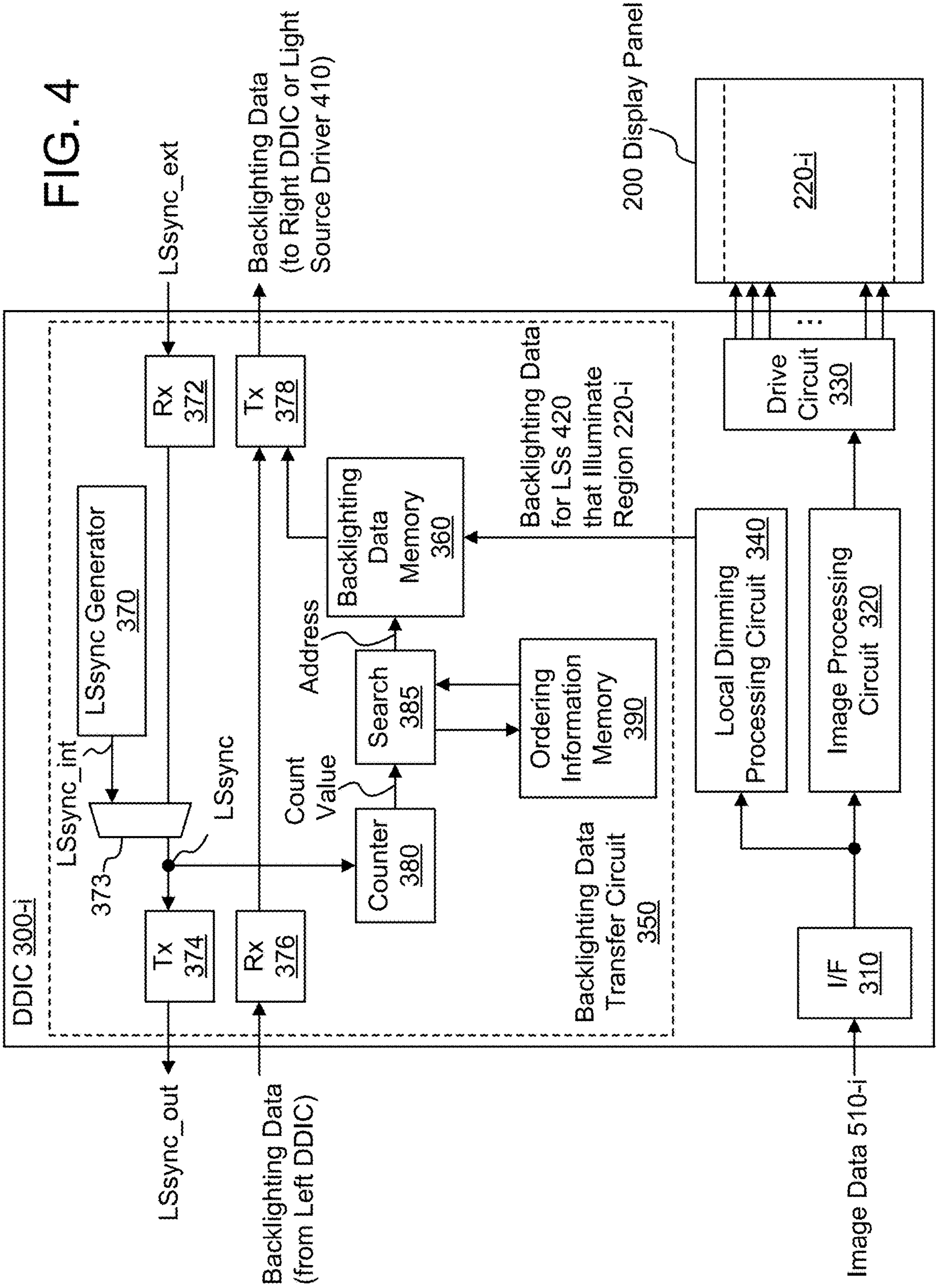
FIG. 4 shows an example configuration of a display driver integrated circuit (DDIC), according to one or more embodiments.

FIG. 4 shows an example configuration of each DDIC **300-*i*, according to one or more embodiments. In the shown embodiment, each DDIC 300-*i* includes an interface circuit 310, an image processing circuit 320, a drive circuit 330, a local dimming processing circuit 340, and a backlighting data transfer circuit 350. The interface circuit 310 is configured to receive the image data 510-*i* from the host 500 (shown in FIG. 2) and to forward the image data 510-*i* to the image processing circuit 320 and the local dimming processing circuit 340. As described above, the image data 510-*i* may include pixel data for the pixels in the region 220-*i*. The image processing circuit 320 of the DDIC 300-*i* is configured to process the image data 510-*i* to generate and provide processed image data to the drive circuit 330. The image processing performed by the image processing circuit 320 may include, but is not limited to, white balance adjustment, gamma correction, contrast enhancement, color adjustment, demura correction, deburn correction, image scaling, gamma transformation, and other image processing. The drive circuit 330 of the DDIC 300-*i* is configured to drive or update the respective pixels in the region 220-*i* of the display panel 200 based on the processed image data received from the image processing circuit 320. In one implementation, the drive circuit 330 may be configured as a source driver that drives respective subpixels of the respective pixels in the region 220-*i*** with drive voltages generated based on the processed image data.

The local dimming processing circuit 340 of the DDIC **300-*i* is configured to generate backlighting data for the respective light sources 420 in the region 220-*i* of the display panel 200 based on the image data 510-*i* for the pixels in the region 220-*i*. In some implementations, as discussed above in relation with FIGS. 3A and 3B, the local dimming processing circuit 340 may be configured to generate the backlighting data for each light source 420 based on the image data for the zone 610 displayed in the subregion 230 corresponding to that light source 420. In other implementations, the local dimming processing circuit 340 may be configured to generate the backlighting data for each light source 420 based on the image data for the pixels in the zone 610 of the display image displayed in the subregion 230 corresponding to that light source 420 and the image data for the pixels in at least portions of the zones 610 adjacent to that zone 610**.

The backlighting data transfer circuit 350 of the DDIC **300-*i* is configured to output the backlighting data generated in the DDIC 300-*i* to the adjacent one of the one or more intervening DDICs 300 if the DDIC 300-*i* is coupled to the light source driver 410 via one or more intervening DDICs 300, and to output the backlighting data generated in the DDIC 300-*i* to the light source driver 410 if the DDIC 300-*i* is coupled directly to the light source driver 410. In the embodiment shown in FIG. 2, where the backlighting data is transferred from left to right over the DDIC chain, the DDIC 300-*i* may be configured to output the backlighting data generated in the DDIC 300-*i* to the right DDIC 300-*i*, if any, or to the light source driver 410**.

The backlighting data transfer circuit 350 of the DDIC **300-*i* is configured to generate the backlighting data synchronization signal LSsync when the DDIC 300-*i* is operating as the master DDIC. The backlighting data transfer circuit 350 of the DDIC 300-*i* is further configured to receive the backlighting data synchronization signal LSsync from the master DDIC via one or more intervening DDIC 300, if any, when the DDIC 300-*i* is operating as a slave DDIC. The backlighting data transfer circuit 350 of the DDIC 300-*i* is further configured to output the backlighting data generated in the DDIC 300-*i* in synchronization with the backlighting data synchronization signal LSsync. In the embodiment shown in FIG. 2, where the backlighting data synchronization signal LSsync is transferred over the DDIC chain from right to left, the DDIC 300-*i*** may be configured to receive the backlighting data synchronization signal LSsync from the right DDIC or to generate the backlighting data synchronization signal LSsync itself, and output the backlighting data synchronization signal LSsync to the left DDIC, if any.

In the embodiment shown in FIG. 4, the backlighting data transfer circuit 350 includes a backlighting data memory 360, an LSsync generator 370, a receiver 372, a selector 373, a transmitter 374, a receiver 376, a transmitter 378, a counter 380, a search circuit 385, and an ordering information memory 390. The backlighting data memory 360 is configured to store the backlighting data generated by the local dimming processing circuit 340. The backlighting data stored in backlighting data memory 360 of the DDIC 300-*i* includes the backlighting data for the light sources 420 that illuminate the region 220-*i* of the display panel 200.

The LSsync generator 370 is configured to generate an internal backlighting data synchronization signal LSsync_int, while the receiver 372 is configured to receive the backlighting data synchronization signal from the DDIC coupled to the receiver 372 (e.g., the right DDIC), if any. The backlighting data synchronization signal received by the receiver 372 may be referred to as the external backlighting data synchronization signal LSsync_ext. The selector 373 is configured to selectively output one of the external backlighting data synchronization signal LSsync_ext and the internal backlighting data synchronization signal LSsync_int as the backlighting data synchronization signal to be used for synchronization for outputting the backlighting data from the DDIC 300-*i*. The backlighting data synchronization signal LSsync output from the selector 373 is indicated by "LSsync" in FIG. 4. More specifically, the selector 373 is configured to output the internal backlighting data synchronization signal LSsync_int as the backlighting data synchronization signal LSsync when the DDIC 300-*i* is operating as the master DDIC, and to output the external backlighting data synchronization signal LSsync_ext as the backlighting data synchronization signal LSsync when the DDIC 300-*i* is operating as a slave DDIC. The backlighting data synchronization signal LSsync output from the selector 373 is further transmitted to the transmitter 374, which is configured to externally output the backlighting data synchronization signal LSsync to the DDIC coupled to the transmitter 374 (e.g., the left DDIC), if any. The output backlighting data synchronization signal is indicated by "LSsync_out" in FIG. 4.

The receiver 376 is configured to receive backlighting data from the DDIC coupled to the receiver 376, if any, and to transfer the received backlighting data to the transmitter 378. The transmitter 378 is configured to receive the backlighting data from the receiver 376 and the backlighting data memory 360, and to transfer the received backlighting data to the DDIC coupled to the transmitter 378 (e.g., to the right DDIC), if any, or to the light source driver 410, if coupled thereto.

The ordering information memory 390 is configured to store ordering information indicative of the order for outputting the backlighting data stored in the backlighting data memory 360. As discussed in detail below, the backlighting data transfer circuit 350 is configured to output the backlighting data in the order indicated by the ordering information. In one implementation, the ordering information stored in the ordering information memory 390 provided in the DDIC 300-*i* may include sequence numbers associated with the backlighting data for the respective light sources 420 that illuminate the region 220-*i* of the display panel 200 for any natural number i between one and four in an embodiment, inclusive, wherein the sequence numbers are each determined to be unique throughout the entire display device 1000. The backlighting data transfer circuit 350 of the DDIC 300-*i* may be configured to output the backlighting data in the ascending or descending order of the sequence numbers. For example, in embodiments where the total number of the light sources 420 is 32 and the sequence numbers take values from zero to 31, in each light source luminance control cycle, the backlighting data associated with the sequence number "0" may be transferred to the light source driver 410 first, the backlighting data associated with the sequence number "1" may be transferred to the light source driver 410 next, and the backlighting data associated with the sequence number "31" may be transferred to the light source driver 410 last. In some embodiments, each sequence number and the backlighting data associated with that sequence number are stored at the same address of the ordering information memory 390 and the backlighting data memory 360, respectively.

The counter 380 and the search circuit 385 form a circuit configured to control the timing of outputting the backlighting data from the backlighting data memory 360 and providing the backlighting data memory 360 with the address from which to retrieve the backlighting data. In one or more embodiments, the counter 380 may be configured to count assertions (e.g., pulses) of the backlighting data synchronization signal LSsync received from the selector 373 and provide the count value of the counter 380 to the search circuit 385. The search circuit 385 may be configured to search the ordering information memory 390 for the sequence number equal to the count value, and, if the count value matches any sequence number stored in the ordering information memory 390, to notify the backlighting data memory 360 of the address at which that sequence number is stored in the ordering information memory 390. The backlighting data memory 360 may be configured to output the backlighting data associated with that sequence number based on the address notified by the search circuit 385. In embodiments where each sequence number and the backlighting data associated with that sequence number are stored at the same address of the ordering information memory 390 and the backlighting data memory 360, respectively, the backlighting data memory 360 may be configured to output the backlighting data from the address notified by the search circuit 385.

Figure 5:
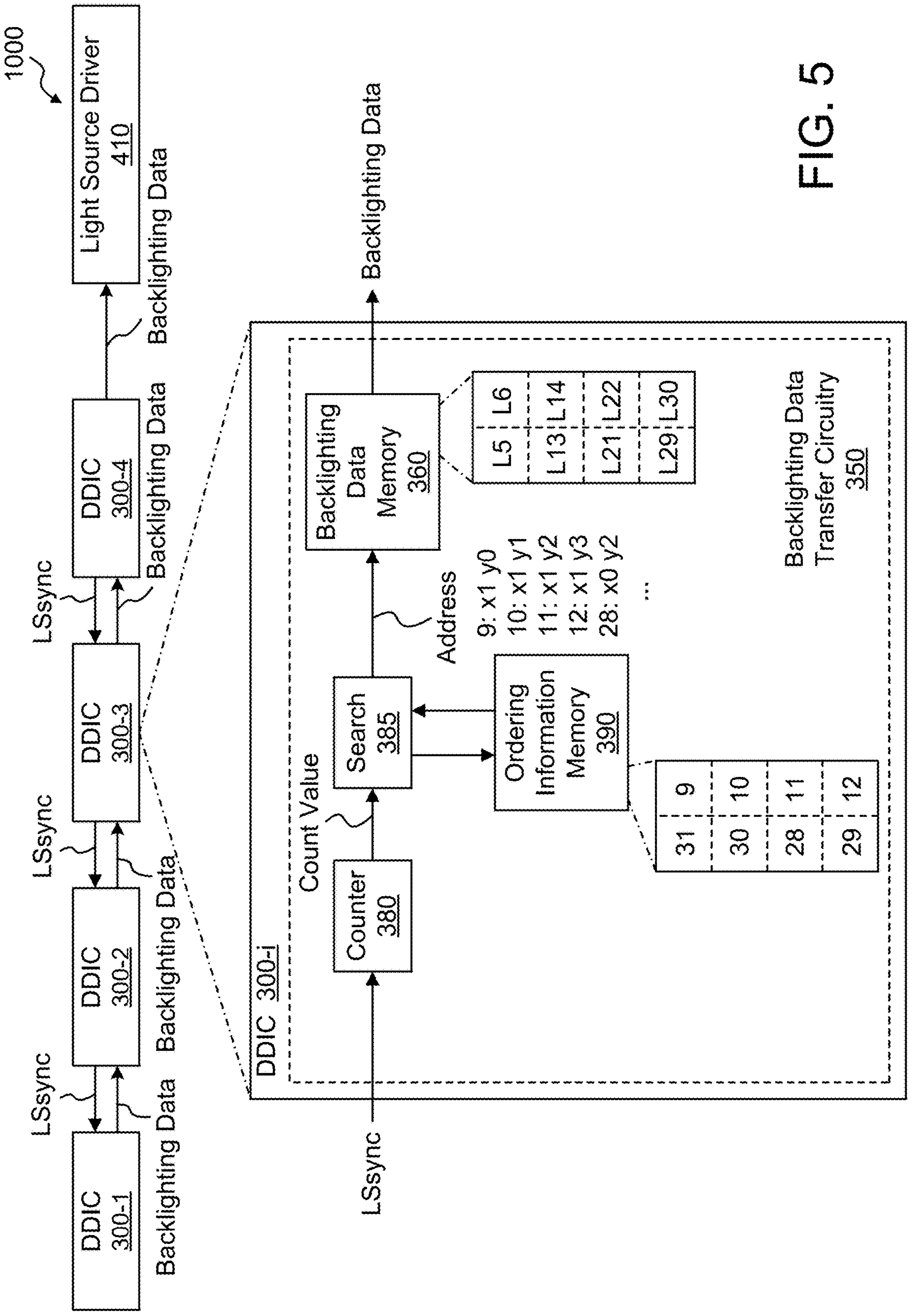
FIG. 5 is a diagram showing an example operation of a DDIC, according to one or more embodiments.

FIG. 5 is a diagram showing an example operation of each DDIC 300-*i*, according to one or more embodiments. While the enlarged view of the DDIC 300-*i* in FIG. 5 shows example settings of the backlighting data memory 360 and the ordering information memory 390 for the DDIC 300-3, those skilled in the art would appreciate that the settings for other DDICs 300 may be determined depending on those DDICs 300 (also see FIG. 6). In the embodiment shown in FIG. 5, each DDIC 300-*i* is configured to generate and store backlighting data for eight light sources 420 in the backlighting data memory 360, and the ordering information memory 390 of each DDIC 300-*i* is configured to store sequence numbers associated with backlighting data for those eight light sources 420.

In the embodiment shown in FIG. 5, in which the DDIC 300-4 operates as the master DDIC, the DDIC 300-4 generates the backlighting data synchronization signal LSsync by the LSsync generator 370 (shown in FIG. 4) and provides the backlighting data synchronization signal LSsync to other DDICs 300, in which the LSsync generators 370 are deactivated. More specifically, the DDIC 300-3 receives the backlighting data synchronization signal LSsync from the DDIC 300-4 and forwards the backlighting data synchronization signal LSsync to the DDIC 300-2, and the DDIC 300-2 further forwards the backlighting data synchronization signal LSsync to the DDIC 300-1.

In each DDIC 300-*i*, the counter 380 is configured to count assertions of the backlighting data synchronization signal LSsync and to provide the count value to the search circuit 385. The search circuit 385 in each DDIC 300-*i* is configured to search the ordering information stored in the ordering information memory 390 using the count value as a search key, and, based on the search result, notify the backlighting data memory 360 of the address from which the backlighting data memory 360 should retrieve and output the backlighting data. In embodiments where the sequence numbers and the backlighting data associated with those sequence numbers are stored at the same address in the ordering information memory 390 and the backlighting data memory 360, respectively, the search circuit 385 in each DDIC 300-*i* may be configured to search the ordering information memory 390 for the sequence number equal to the count value, and, if the count value matches any sequence number stored in the ordering information memory 390, notify the backlighting data memory 360 of the address at which that sequence number is stored in the ordering information memory 390. The backlighting data memory 360 outputs the backlighting data from the address notified by the search circuit 385, and the backlighting data output from the backlighting data memory 360 is transferred to the light source driver 410 over the DDIC chain.

In the example shown in FIG. 5, when the count value of the counter 380 of the DDIC 300-3 reaches "9" after a series of assertions of the backlighting data synchronization signal LSsync, the search circuit 385 may notify the backlighting data memory 360 of the address "x1 y0" at which the sequence number "9" is stored in the ordering information memory 390, and the backlighting data memory 360 may output the backlighting data "L6" from the address "x1 y0". Then, when the count value of the counter 380 of the DDIC 300-3 reaches "10" as a result of the next assertion of the backlighting data synchronization signal LSsync, the search circuit 385 may notify the backlighting data memory 360 of the address "x1 y1" at which the sequence number "10" is stored in the ordering information memory 390, and the backlighting data memory 360 may output the backlighting data "L14" from the address "x1 y1".

Figure 6:
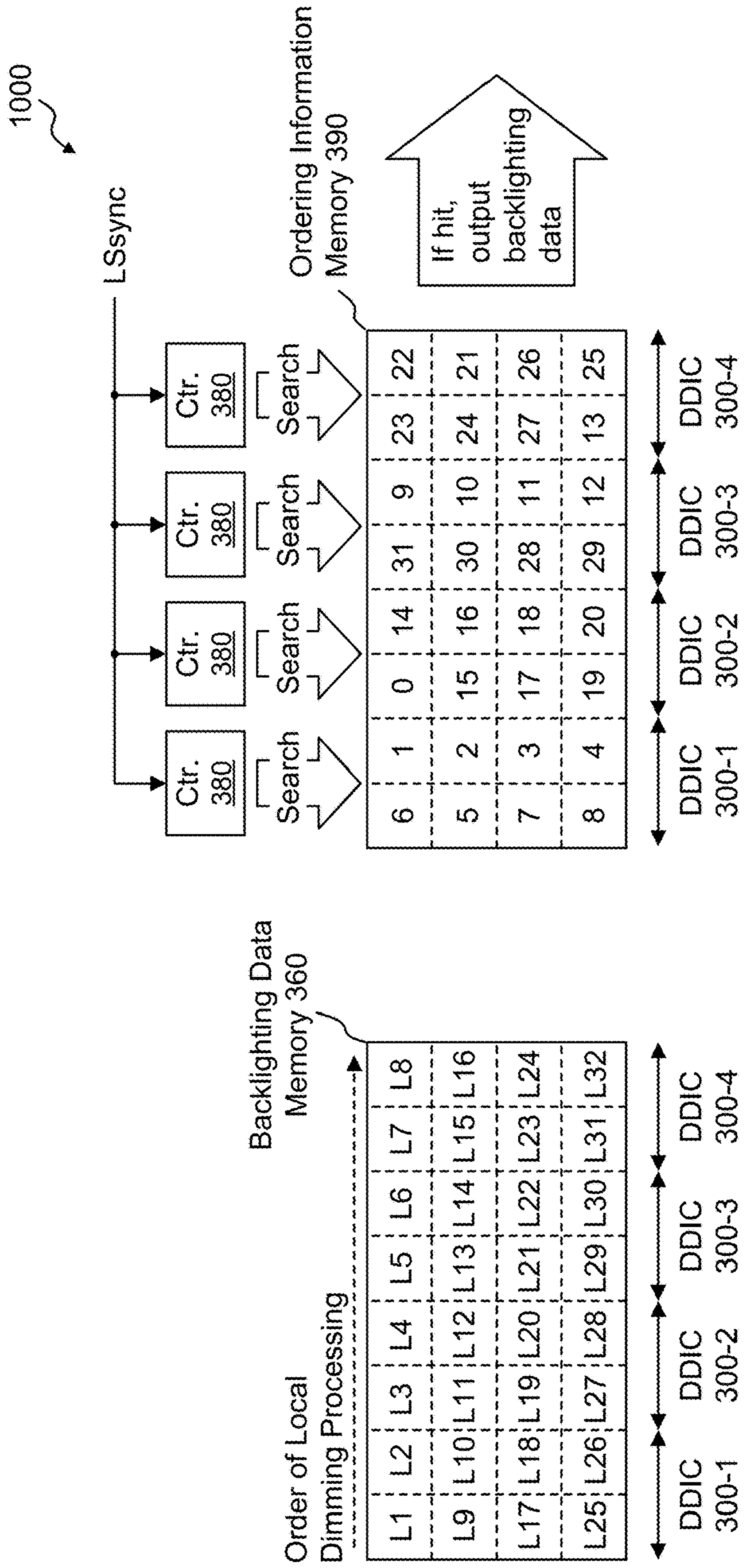
FIG. 6 is a schematic diagram showing an example operation of a display device, according to one or more embodiments.
Figure 7:
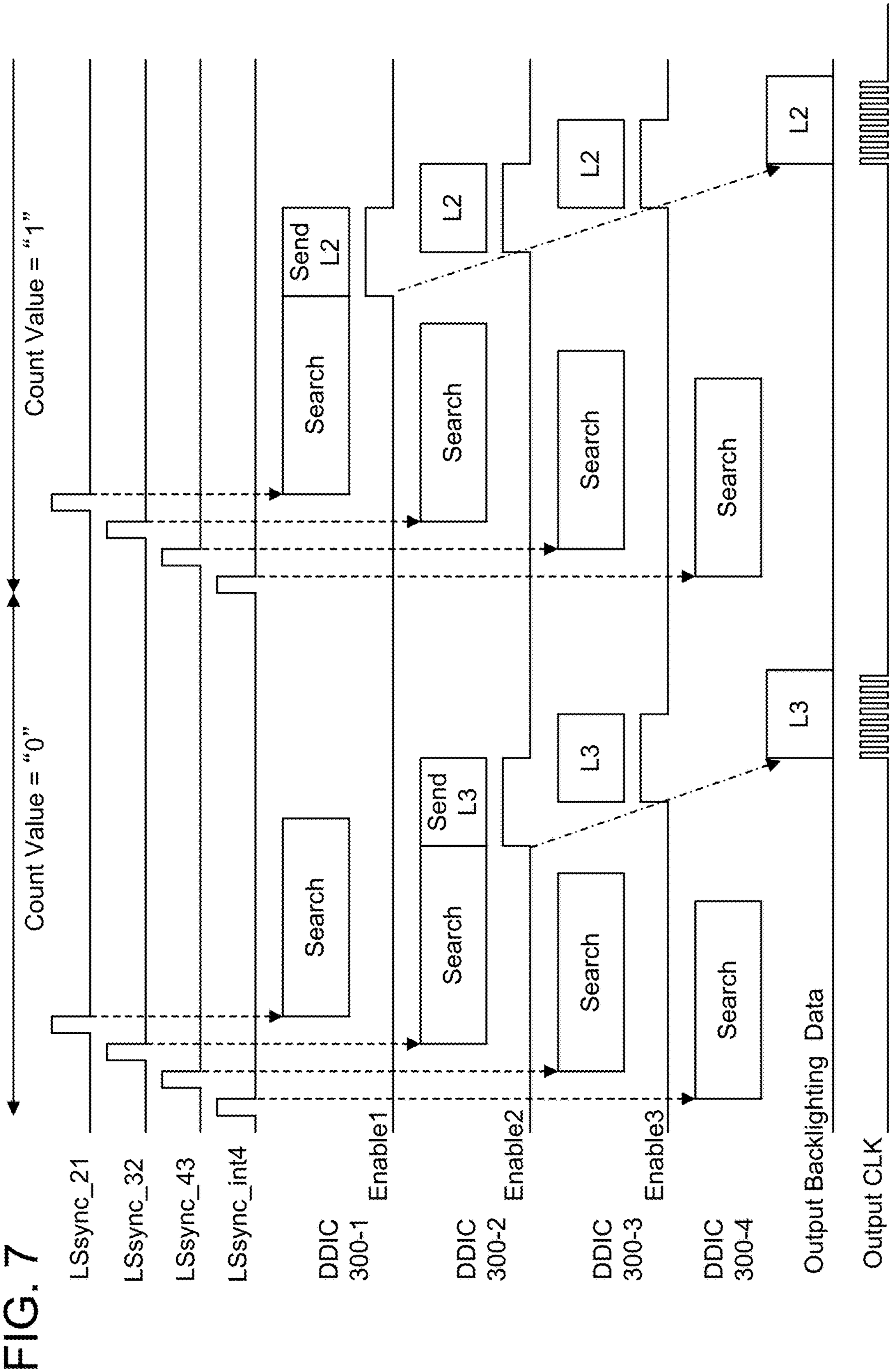
FIG. 7 is a timing diagram showing an example operation of a display device during an initial phase of a light source luminance control cycle, according to one or more embodiments.

FIG. 6 is a schematic diagram showing an example operation of the entire display device 1000, according to one or more embodiments, and FIG. 7 is a timing diagram showing the example operation during an initial phase of a light source luminance control cycle, according to one or more embodiments. In FIG. 7, "LSsync_int4" indicates the waveform of the backlighting data synchronization signal LSsync generated in the DDIC 300-4, "LSsync_43" indicates the waveform of the backlighting data synchronization signal LSsync on the link between the DDIC 300-4 and the DDIC 300-3, "LSsync_32" indicates the waveform of the backlighting data synchronization signal LSsync on the link between the DDIC 300-3 and the DDIC 300-2, and "LSsync_21" indicates the waveform of the backlighting data synchronization signal LSsync on the link between the DDIC 300-2 and the DDIC 300-1. Further, "Enable1", "Enable2", and "Enable3" indicate the waveforms of enable signals that enable the DDICs 300-1, 300-2, and 300-3 to transfer the backlighting data to the adjacent DDICs, respectively, and "Output Backlighting Data" indicates the backlighting data output from the DDIC 300-4 to the light source driver 410.

Referring to FIG. 6, the backlighting data for the respective light sources 420 are generated by the local dimming processing circuits 340 of the respective DDICs 300-1 to 300-4 and stored in the backlighting data memories 360 of the respective DDICs 300-1 to 300-4. In the embodiment shown in FIG. 6, the backlighting data "L1" to "L32" for the respective light sources 420 are generated in the raster order of the light source array.

When the backlighting data synchronization signal LSsync is asserted for the first time during the light source luminance control cycle, the count values of the counters 380 of the respective DDICs 300-1 to 300-4 are set to "0" as shown in FIG. 7. In response to the count values being set to "0", the search circuits 385 of the respective DDICs 300-1 to 300-4 search the ordering information memories 390 for the sequence number equal to the count value "0". In the embodiment shown in FIG. 6, the sequence number "0" is stored in the ordering information memory 390 of the DDIC 300-2, and the search circuit 385 of the DDIC 300-2 notifies the backlighting data memory 360 of the address at which the sequence number "0" is stored in the ordering information memories 390. The backlighting data memory 360 of the DDIC 300-2 outputs the backlighting data "L3" from the address notified from the search circuit 385. The backlighting data "L3" is transferred to the DDIC 300-4 via the DDIC 300-3 and then output to the light source driver 410.

When the backlighting data synchronization signal LSsync is then asserted again, the count values of the counters 380 of the respective DDICs 300-1 to 300-4 are incremented to "1" as shown in FIG. 7. In response to the count values being set to "1", the search circuits 385 of the respective DDICs 300-1 to 300-4 search the ordering information memories 390 for the sequence number equal to the count value "1". In the embodiment shown in FIG. 6, the sequence number "1" is stored in the ordering information memory 390 of the DDIC 300-1, and the search circuit 385 of the DDIC 300-1 notifies the backlighting data memory 360 of the address at which the sequence number "1" is stored in the ordering information memories 390. The backlighting data memory 360 of the DDIC 300-1 outputs the backlighting data "L2" from the address notified by the search circuit 385. The backlighting data "L2" is transferred to the DDIC 300-4 via the DDICs 300-3 and 300-2 and then output to the light source driver 410.

Figure 8:
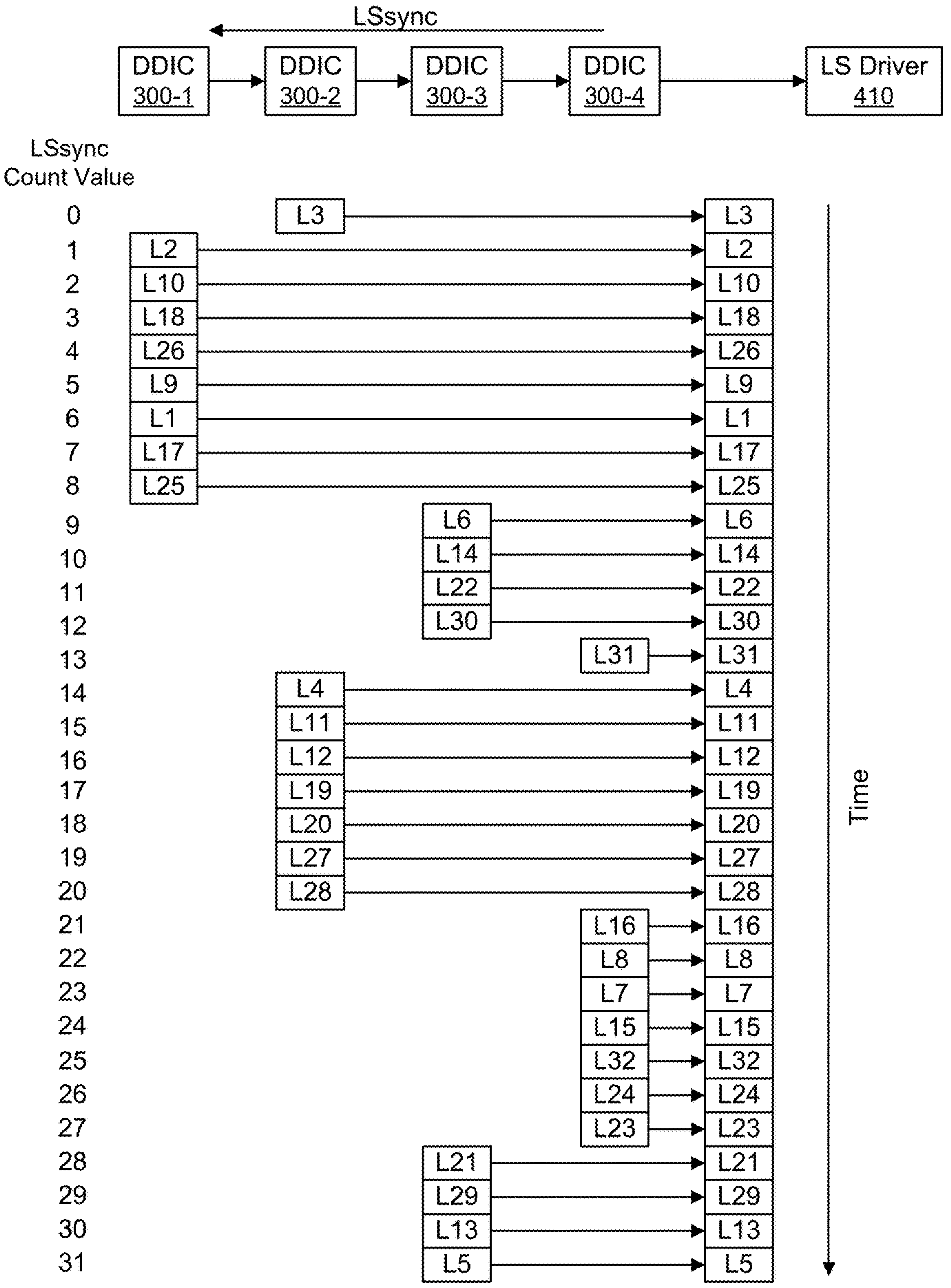
FIG. 8 shows an example procedure for transferring backlighting data from DDICs to a light source driver, according to one or more embodiments.

Thereafter, in response to successive assertions of the backlighting data synchronization signal LSsync, the count values of the counters 380 of the DDICs 300-1 to 300-4 are successively incremented until the count values reach "31", and a similar operation is performed each time the count values of the counters 380 are incremented. This causes the DDICs 300-1 to 300-4 to transfer the backlighting data to the light source driver 410 in the order indicated by the sequence numbers stored in the ordering information memories 390 of the respective DDICs 300-1 to 300-4. FIG. 8 shows the transfer of the backlighting data "L1" to "L32" from the DDICs 300-1 to 300-4 to the light source driver 410 by the operation shown in FIG. 6, according to one or more embodiments. The count values of the counters 380 of the respective DDICs 300-1 to 300-4 are successively incremented from "0" to "31", and the backlighting data associated with the sequence numbers "0" to "31" are successively transferred to the light source driver 410.

The scheme described in relation to FIGS. 5 to 8 enables the backlighting data to be efficiently transferred from the DDICs 300-1 to 300-4 to the light source driver 410 in the order required to cause the light source driver 410 to drive the light sources 420 as desired by appropriately setting the sequence numbers in the ordering information memory 390. The disclosed scheme does not require the full set of backlighting data to be stored in the master DDIC, which may allow efficient use of memory in the DDICs 300-1 to 300-4 and reduce the required memory capacity. Further, the disclosed scheme does not require sorting the backlighting data in the master DDIC, which may effectively reduce the lead time for transferring the backlighting data to the light source driver 410.

In the embodiments described in relation to FIGS. 5 to 8, the ordering information memory 390 of each DDIC 300 is searched each time the backlighting data synchronization signal LSsync is asserted and the count value of the counter 380 is incremented. However, in embodiments where the backlight device 400 includes an increased number of the light sources 420, the search of the ordering information memory 390 may take a considerable amount of time, which may result in an undesirable increase in the lead time for transferring the backlighting data to the light source driver 410. Embodiments for eliminating the need to search the ordering information memory 390 to reduce the lead time for transferring the backlighting data to the light source driver 410 are described below.

Figure 9:
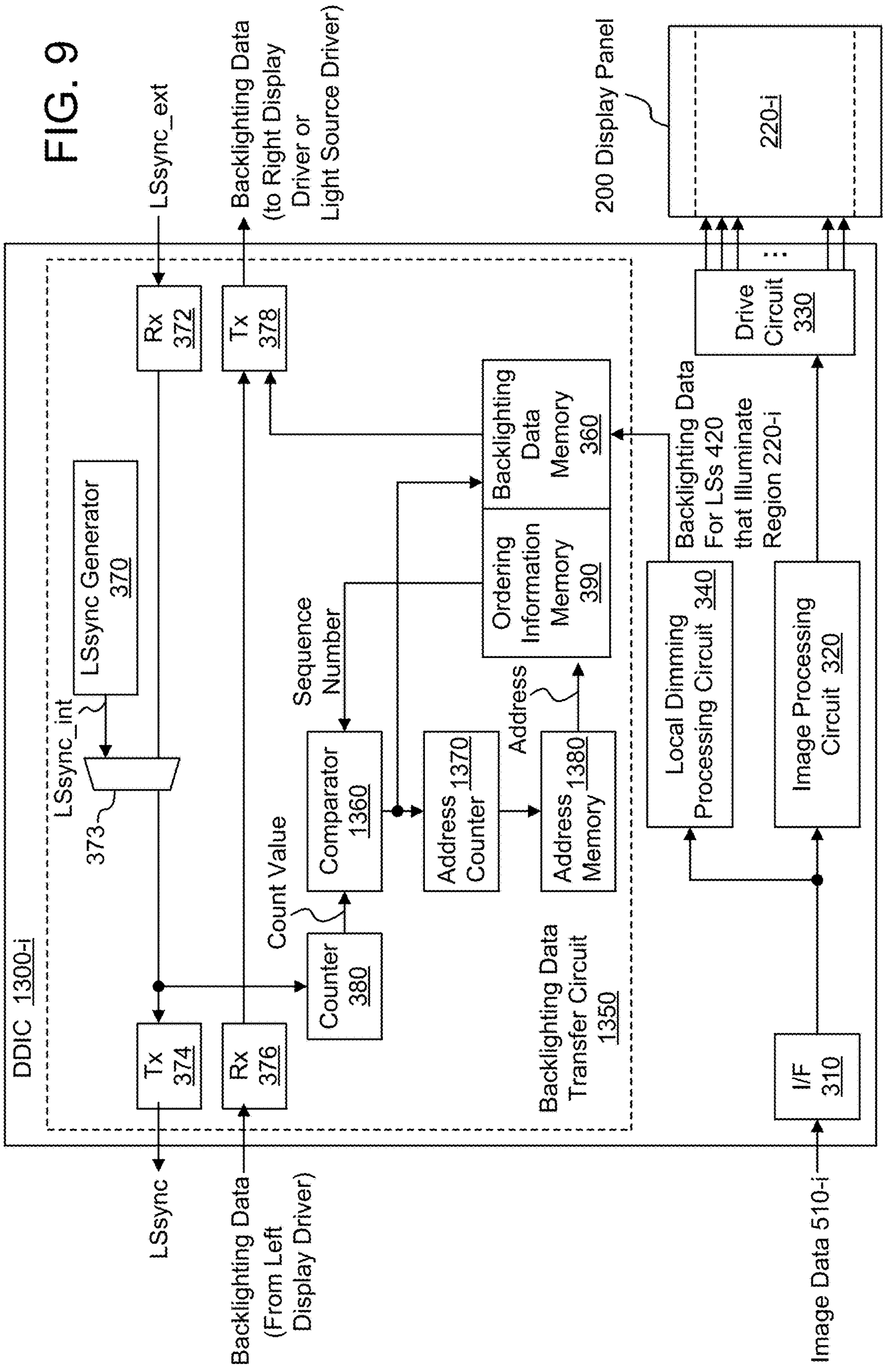
FIG. 9 shows an example configuration of a DDIC, according to other embodiments.

FIG. 9 shows an example configuration of each DDIC, designated by numeral 1300-*i*, configured to eliminate the need to search the ordering information memory 390, according to other embodiments. The DDIC 1300-*i* includes a backlighting data transfer circuit 1350 configured to transfer the backlighting data generated by the local dimming processing circuit 340 to the light source driver 410. The backlighting data transfer circuit 1350 is configured similarly to the backlighting data transfer circuit 350 shown in FIG. 4, but includes a comparator 1360, an address counter 1370, and an address memory 1380 in place of the search circuit 385. In the embodiment shown in FIG. 9, the sequence number retrieved from the ordering information memory 390 is provided to the comparator 1360, and each sequence number stored in the ordering information memory 390 and the backlighting data associated with that sequence number are stored at the same address of the ordering information memory 390 and the backlighting data memory 360, respectively.

The comparator 1360 is configured to compare the count value received from the counter 380 with the sequence number received from the ordering information memory 390, and to assert the output signal of the comparator 1360 in response to the count value matching (or being equal to) the sequence number. The address counter 1370 is configured to count assertions of the output signal of the comparator 1360.

The address memory 1380 is configured to store addresses of the ordering information memory 390 and the backlighting data memory 360 to be accessed in response to the count value of the counter 380 matching the sequence numbers stored in the ordering information memory 390. The stored addresses are associated with possible values of the count value of the address counter 1370, and the address memory 1380 is further configured to select one of the stored addresses based on the count value of the address counter 1370 and to notify the selected address to the ordering information memory 390 and the backlighting data memory 360. The ordering information memory 390 is configured to provide the comparator 1360 with the sequence number retrieved from the address notified from the address memory 1380, and the backlighting data memory 360 is configured to output the backlighting data from the address notified from the address memory 1380.

Figure 10:
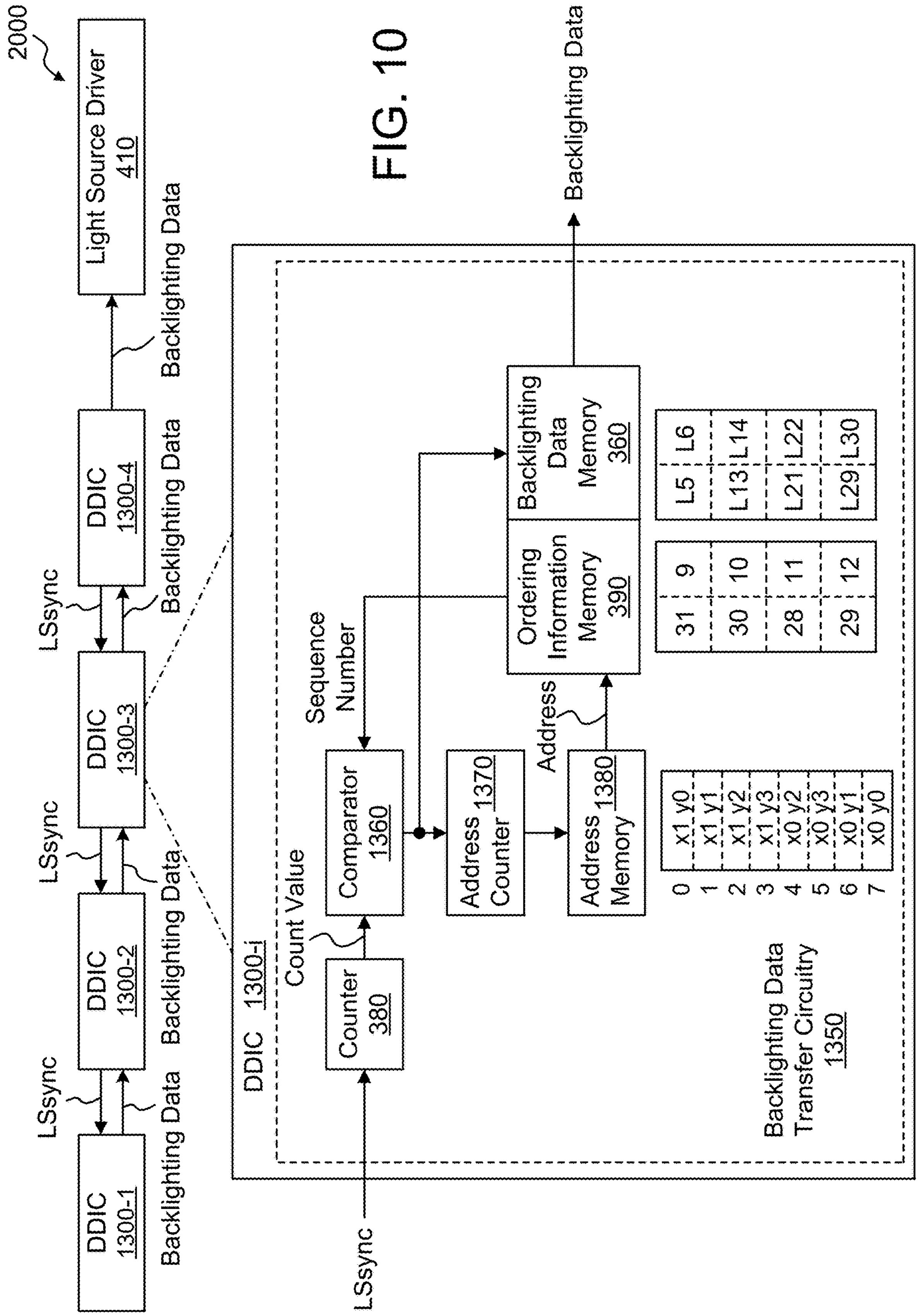
FIG. 10 is a diagram showing an example operation of a DDIC, according to one or more embodiments.

FIG. 10 is a diagram showing an example operation of each DDIC 1300-*i* in the display device, denoted by numeral 2000, according to one or more embodiments. While the enlarged view of the DDIC 1300-*i* in FIG. 10 shows example settings of the backlighting data memory 360 and the ordering information memory 390 for the DDIC 1300-3, those skilled in the art would appreciate that the settings for other DDICs 1300 may be determined depending on those DDICs 1300 (also see FIG. 11). In the shown embodiment, each DDIC 1300-*i* is configured to generate and store backlighting data for eight light sources 420 in the backlighting data memory 360, and the ordering information memory 390 of each DDIC 1300-*i* is configured to store sequence numbers associated with backlighting data for those eight light sources 420.

At the beginning of the light source luminance control cycle, the count value of the address counter 1370 is “0”, and the address memory 1380 notifies the ordering information memory 390 and the backlighting data memory 360 of the address associated with the count value “0”. The ordering information memory 390 outputs the sequence number from the address notified by the address memory 1380. In addition, the backlighting data memory 360 becomes ready to output the backlighting data from the address notified by the address memory 1380.

At the beginning of the light source luminance control cycle, a master DDIC selected from the DDIC 1300-1 to 1300-4 starts generating the backlighting data synchronization signal LSsync by the LSsync generator 370 (shown in FIG. 9) incorporated therein. In the embodiment shown in FIG. 10, the DDIC 1300-4 operates as the master DDIC and provides the backlighting data synchronization signal LSsync to other DDICs 1300, in which the LSsync generators 370 are deactivated. More specifically, the DDIC 1300-3 receives the backlighting data synchronization signal LSsync from the DDIC 1300-4 and forwards the backlighting data synchronization signal LSsync to the DDIC 1300-2, and the DDIC 1300-2 further forwards the backlighting data synchronization signal LSsync to the DDIC 1300-1.

In each DDIC 1300-*i*, the counter 380 counts assertions of the backlighting data synchronization signal LSsync and provides the count value to the comparator 1360. The comparator 1360 compares the count value received from the counter 380 with the sequence number received from the ordering information memory 390. The comparator 1360 asserts the output signal in response to the count value matching the sequence number. In response to the assertion of the output signal of the counter 380, the backlighting data memory 360 outputs backlighting data from the address notified by the address memory 1380.

Meanwhile, the address counter 1370 increments its count value in response to the assertion of the output signal of the comparator 1360. In response to the incrementation of the count value, the address memory 1380 updates the address notified to the ordering information memory 390 and the backlighting data memory 360 to the address associated with the incremented count value. In response to the update of the notified address, the ordering information memory 390 provides the sequence number stored at the address newly notified from the address memory 1380 to the comparator 1360, and the backlighting data memory 360 becomes ready to output backlighting data from the address newly notified from the address memory 1380. A similar process is performed each time the backlighting data synchronization signal LSsync is asserted until the transfer of the backlighting data for all light sources 420 to the light source driver 410 is completed.

In the embodiment shown in FIG. 10, at the beginning of the light source luminance control cycle, the count value of the address counter 1370 is “0” and the address memory 1380 notifies the ordering information memory 390 and the backlighting data memory 360 of the address “x1 y0” in response to the count value being “0”. This causes the ordering information memory 390 to output the sequence number “9” from the address “x1 y0”. Further, the backlighting data memory 360 becomes ready to output the backlighting data “L6” from the address “x1 y0”.

When the count value of the counter 380 of the DDIC 300-3 reaches “9” after a series of assertions of the backlighting data synchronization signal LSsync, the comparator 1360 asserts the output signal in response to the count value matching the sequence number "9" received from the ordering information memory 390. In response to the assertion of the output signal of the comparator 1360, the backlighting data memory 360 outputs the backlighting data "L6" from the address "x1 y0". Meanwhile, the address counter 1370 increments its count value to "1" in response to the assertion of the output signal of the comparator 1360. In response to the incrementation of the count value to "1", the address memory 1380 updates the address notified to the ordering information memory 390 and the backlighting data memory 360 to the address "x1 y1", which is associated with the incremented count value "1". In response to the update of the notified address, the ordering information memory 390 provides the comparator 1360 with the sequence number "10" from the address "x1 y1", and the backlighting data memory 360 becomes ready to output backlighting data "L14" from the address "x1 y1".

Then, when the count value of the counter 380 of the DDIC 300-3 reaches "10" as a result of the next assertion of the backlighting data synchronization signal LSsync, the comparator 1360 asserts the output signal in response to the count value matching the sequence number "10" received from the ordering information memory 390. In response to the assertion of the output signal of the comparator 1360, the backlighting data memory 360 outputs the backlighting data "L14" from the address "x1 y1". Meanwhile, the address counter 1370 increments its count value to "2" in response to the assertion of the output signal of the comparator 1360. In response to the incrementation of the count value to "2", the address memory 1380 updates the address notified to the ordering information memory 390 and the backlighting data memory 360 to the address "x1 y2", which is associated with the incremented count value "2". In response to the update of the notified address, the ordering information memory 390 provides the comparator 1360 with the sequence number "11" from the address "x1 y2", and the backlighting data memory 360 becomes ready to output backlighting data "L22" from the address "x1 y2".

Figure 11:
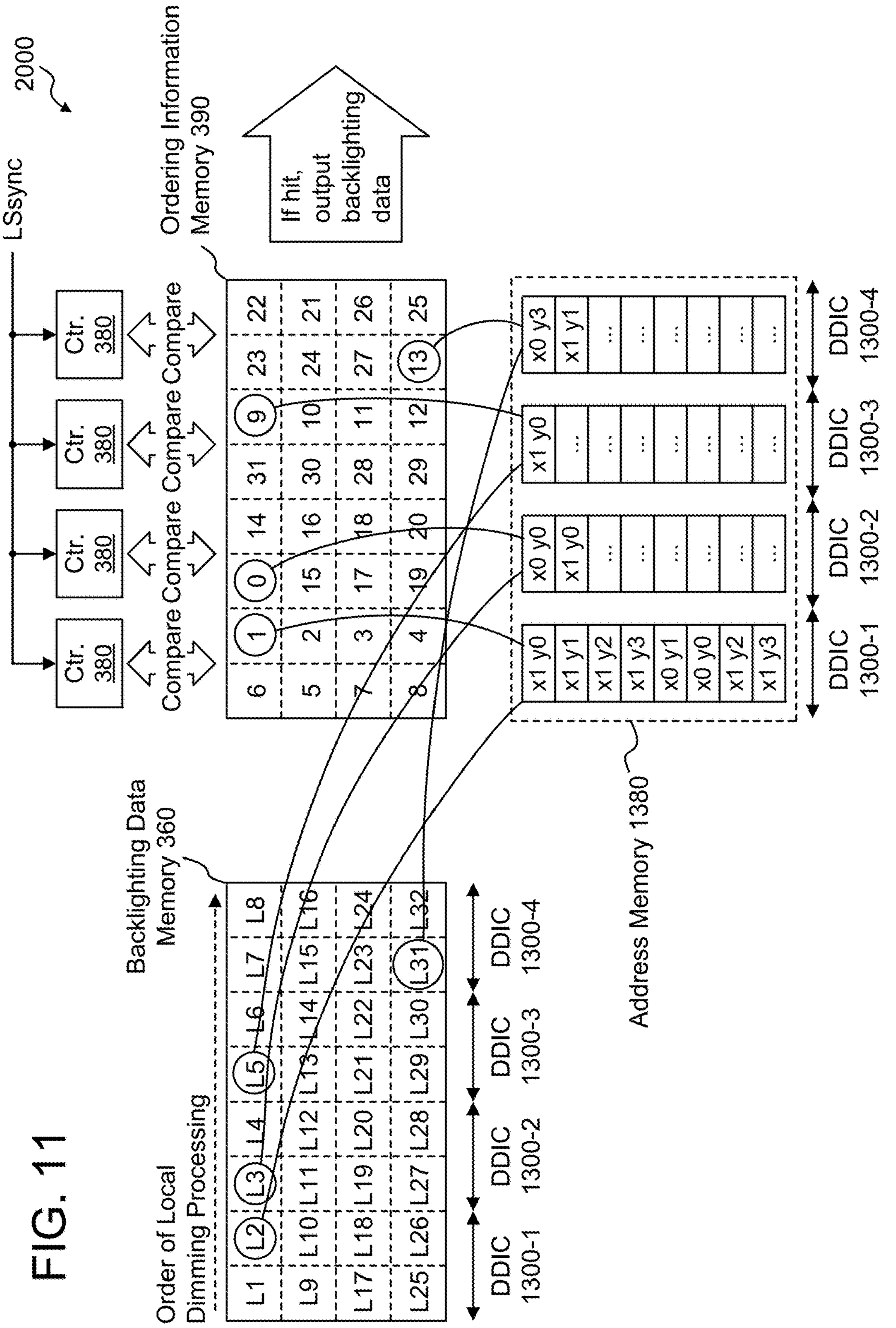
FIG. 11 is a schematic diagram showing an example operation of a display device, according to one or more embodiments.
Figure 12:
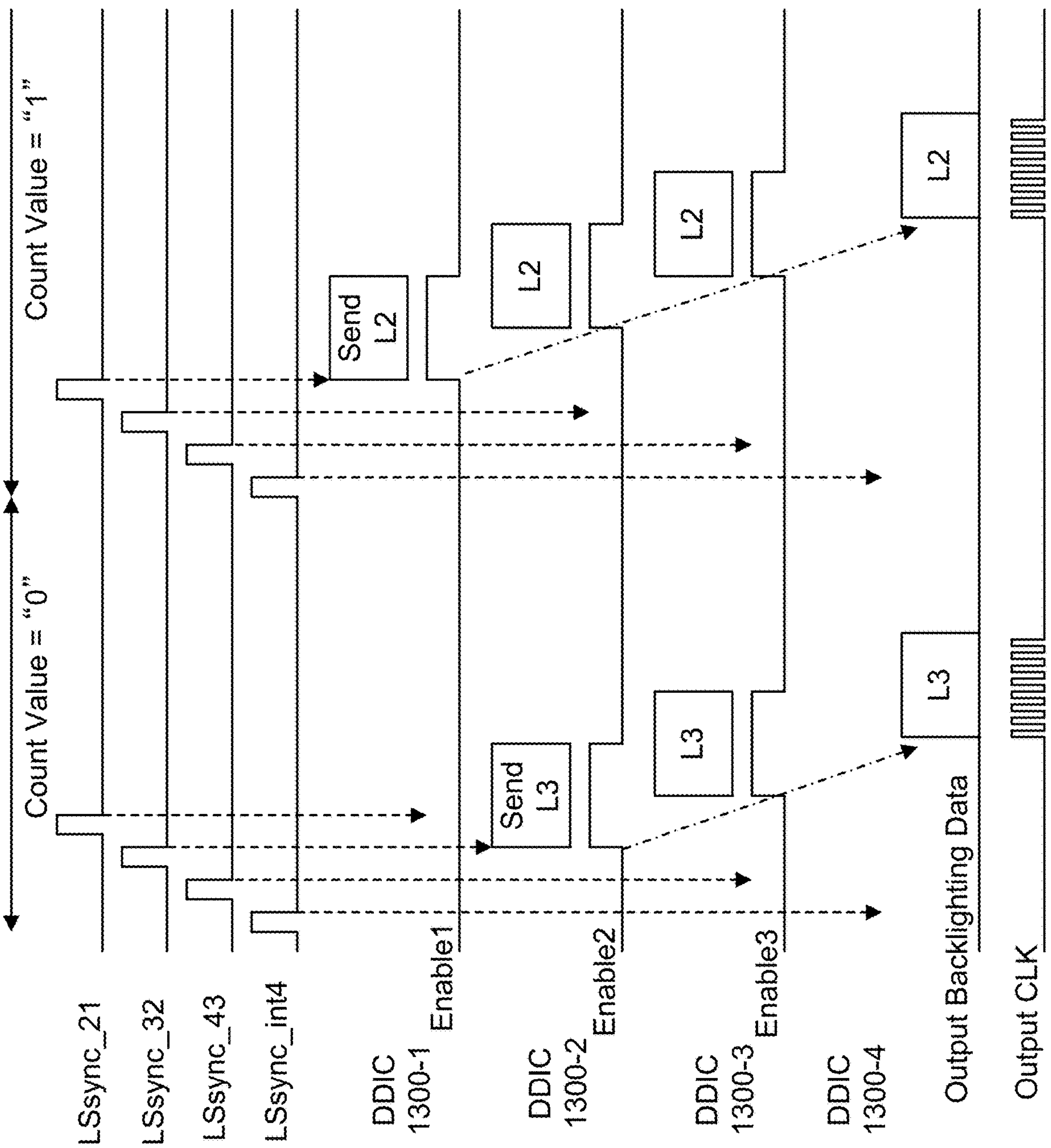
FIG. 12 is a timing diagram showing an example operation of a display device during an initial phase of a light source luminance control cycle, according to one or more embodiments.

FIG. 11 is a schematic diagram showing an example operation of the entire display device 2000, according to one or more embodiments, and FIG. 12 is a timing diagram showing the example operation during an initial phase of a light source luminance control cycle, according to one or more embodiments. In FIG. 12, "LSsync_int4" indicates the waveform of the backlighting data synchronization signal LSsync generated in the DDIC 1300-4, "LSsync_43" indicates the waveform of the backlighting data synchronization signal LSsync on the link between the DDIC 1300-4 and the DDIC 1300-3, "LSsync_32" indicates the waveform of the backlighting data synchronization signal LSsync on the link between the DDIC 1300-3 and the DDIC 1300-2, and "LSsync_21" indicates the waveform of the backlighting data synchronization signal LSsync on the link between the DDIC 1300-2 and the DDIC 1300-1. Further, "Enable1", "Enable2", and "Enable3" indicate the waveforms of the enable signals that enables the DDICs 1300-1, 1300-2, and 1300-3 to transfer the backlighting data to the adjacent DDICs, respectively, and "Output Backlighting Data" indicates the backlighting data output from the DDIC 1300-4 to the light source driver 410.

Referring to FIG. 11, the backlighting data for the respective light sources 420 are generated by the local dimming processing circuits 340 of the respective DDICs 1300-1 to 1300-4, and stored in the backlighting data memories 360 of the respective DDICs 1300-1 to 1300-4. In the embodiment shown in FIG. 11, the backlighting data "L1" to "L32" for the respective light sources 420 are generated in the raster order of the light source array.

At the beginning of the light source luminance control cycle, the count values of the address counters 1370 of the respective DDICs 1300-1 to 1300-4 are set to "0", and the address memories 1380 of the DDICs 1300-1 to 1300-4 notify the respective ordering information memories 390 of the addresses associated with the count value "0". The ordering information memories 390 of the DDICs 1300-1 to 1300-4 provide the respective comparators 1360 with the sequence numbers associated with the count value "0". In the embodiment shown in FIG. 11, the address memories 1380 of the DDICs 1300-1 to 1300-4 notify the respective ordering information memories 390 of the addresses "x1 y0", "x0 y0", "x1 y0", and "x0 y3". As a result, the ordering information memories 390 of the DDICs 1300-1 to 1300-4 provide the respective comparators 1360 with the sequence number "1", "0", "9", and "13" from the addresses "x1 y0", "x0 y0", "x1 y0", and "x0 y3", respectively, while the backlighting data memories 360 of the DDICs 1300-1 to 1300-4 become ready to output backlighting data "L2", "L3", "L5", and "L31", respectively.

When the backlighting data synchronization signal LSsync is asserted for the first time during the light source luminance control cycle, the count values of the counters 380 of the respective DDICs 1300-1 to 1300-4 are set to "0" as shown in FIG. 12. In response to the count values being set to "0", as shown in FIG. 11, the comparator 1360 of the DDIC 1300-2, which receives the sequence number "0" from the ordering information memory 390 of the DDIC 1300-2, asserts the output signal, and the backlighting data memory 360 of the DDIC 1300-2 outputs the backlighting data "L3" from the address "x0 y0" notified from the address memory 1380. As shown in FIG. 12, the backlighting data "L3" is transferred to the light source driver 410 via the DDICs 1300-3 and 1300-4. Other DDICs 1300 do not output backlighting data because the count values of the counters 380 are different from the sequence numbers received from the ordering information memories 390.

Meanwhile, the address counter 1370 of the DDIC 1300-2 increments its count value to "1" in response to the assertion of the output signal of the comparator 1360. In response to the incrementation of the count value to "1", the address memory 1380 of the DDIC 1300-2 updates the address notified to the ordering information memory 390 and the backlighting data memory 360 to the address "x1 y0", which is associated with the incremented count value "1". In response to the update of the notified address, the ordering information memory 390 of the DDIC 1300-2 provides the comparator 1360 with the sequence number "14" from the address "x1 y0", and the backlighting data memory 360 becomes ready to output backlighting data "LA" from the address "x1 y0".

When the backlighting data synchronization signal LSsync is then asserted again, the count values of the counters 380 of the respective DDICs 1300-1 to 1300-4 are set to "1" as shown in FIG. 12. In response to the count values being set to "1", as shown in FIG. 11, the comparator 1360 of the DDIC 1300-1, which receives the sequence number "1" from the ordering information memory 390 of the DDIC 1300-1, asserts the output signal, and the backlighting data memory 360 of the DDIC 1300-1 outputs the backlighting data "L2" from the address "x1 y0" notified from the address memory 1380. As shown in FIG. 12, the backlighting data "L2" is transferred to the light source driver 410 via the DDICs 1300-2, 1300-3, and 1300-4. Other DDICs 1300 do not output backlighting data because the count values of the counters 380 are different from the sequence numbers received from the ordering information memories 390.

Meanwhile, the address counter 1370 of the DDIC 1300-1 increments its count value to "1" in response to the assertion of the output signal of the comparator 1360. In response to the incrementation of the count value to "1", the address memory 1380 of the DDIC 1300-1 updates the address notified to the ordering information memory 390 and the backlighting data memory 360 to the address "x1 y1", which is associated with the incremented count value "1". In response to the update of the notified address, the ordering information memory 390 of the DDIC 1300-1 provides the comparator 1360 with the sequence number "2" from the address "x1 y1", and the backlighting data memory 360 becomes ready to output backlighting data "L10" from the address "x1 y1". Thereafter, in response to successive assertions of the backlighting data synchronization signal LSsync, the count values of the counters 380 of the DDICs 1300-1 to 1300-4 are successively incremented until the count values reach "31", and a similar operation is performed each time the count values of the counters 380 are incremented. This causes the DDICs 1300-1 to 1300-4 to transfer the backlighting data to the light source driver 410 in the order indicated by the sequence numbers stored in the ordering information memories 390 of the respective DDICs 1300-1 to 1300-4.

The configuration and operation of the DDICs 1300-1 to 1300-4 according to the embodiments described in relation to FIGS. 9 to 12 may further reduce the lead time for transferring the backlighting data to the light source driver 410 as compared to the embodiments described in relation to FIGS. 5 to 8, because the address memories 1380 of the respective DDICs 1300-1 to 1300-4 indicate the addresses of the ordering information memories 390 to be accessed, thereby eliminating the need to search the ordering information memories 390.

Figure 13A:
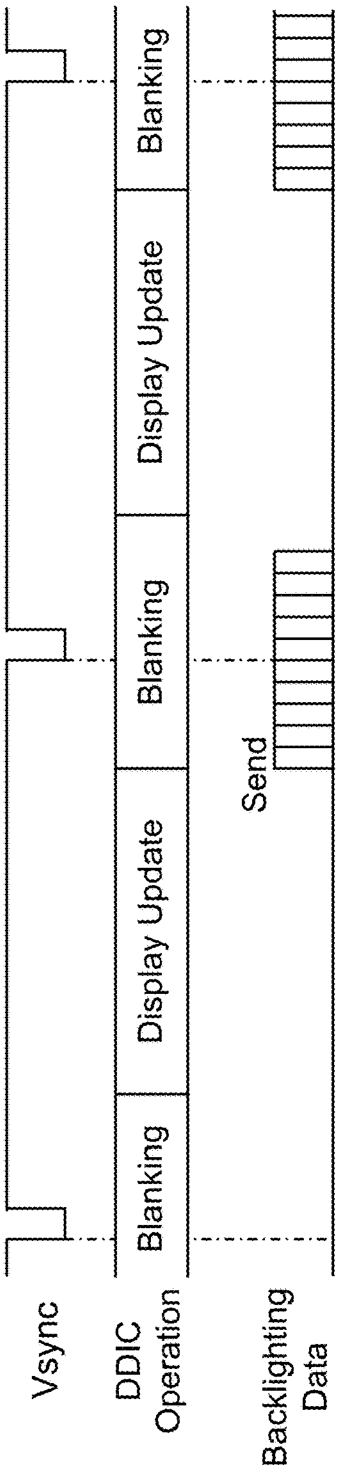
FIG. 13A is a timing diagram showing an example operation for transferring backlighting data to a light source driver, according to one or more embodiments.

FIG. 13A is a timing diagram showing an example operation for transferring the backlighting data to the light source driver 410, according to one or more embodiments. In FIG. 13A (and FIG. 13B), "Vsync" indicates the waveform of the vertical synchronization signal that defines vertical synchronization periods (or frame periods). Further, "Display Update" indicates a display update period during which the pixels of the display panel 200 are updated, and "Blanking" indicates a blanking period. In the shown embodiment, the backlighting data for the respective light sources 420 is transferred to the light source driver 410 during each blanking period.

In some implementations, the blanking period may have a time duration that is insufficient for the full set of backlighting data to be transferred to the light source driver 410, particularly in embodiments where the backlight device 400 includes an increased number of light sources 420. As is known in the art, recent panel display devices may operate at an increased frame rate, such as 120 Hz or 180 Hz, which may be accompanied by a reduction in the time duration of the blanking period.

Figure 13B:
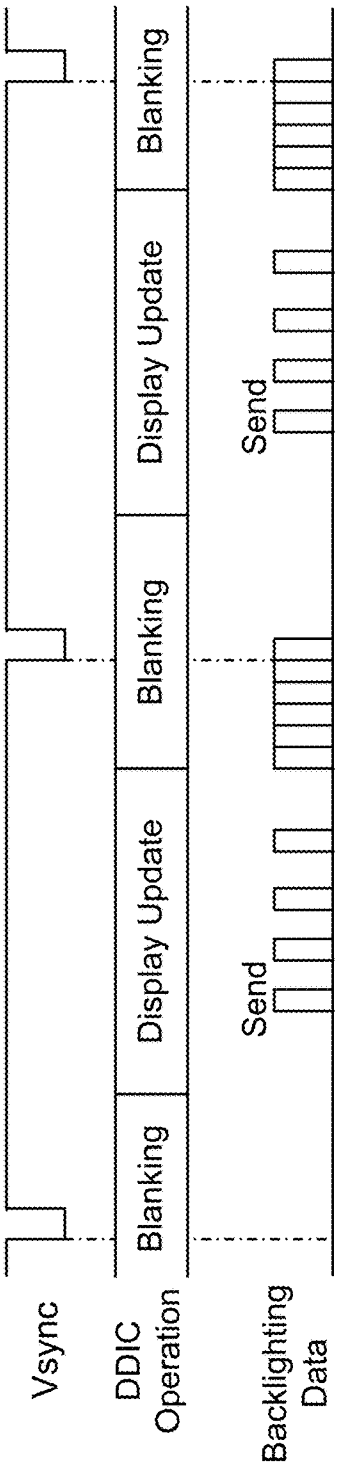
FIG. 13B is a timing diagram showing an example operation for transferring backlighting data to a light source driver, according to other embodiments.

To address this issue, in one or more embodiments, as shown in FIG. 13B, a portion of the backlighting data may be transferred to the light source driver 410 during the display update period. In such embodiments, the remainder of the backlighting data may be transferred during the blanking period. The backlighting data transfer process described in relation to FIGS. 10 to 12, which effectively reduces the lead time between the generation and transfer of the backlighting data, may relax restrictions on the timing of the transfer of the backlighting data, thereby facilitating the transfer of the backlighting data to the light source driver.

Figure 14:
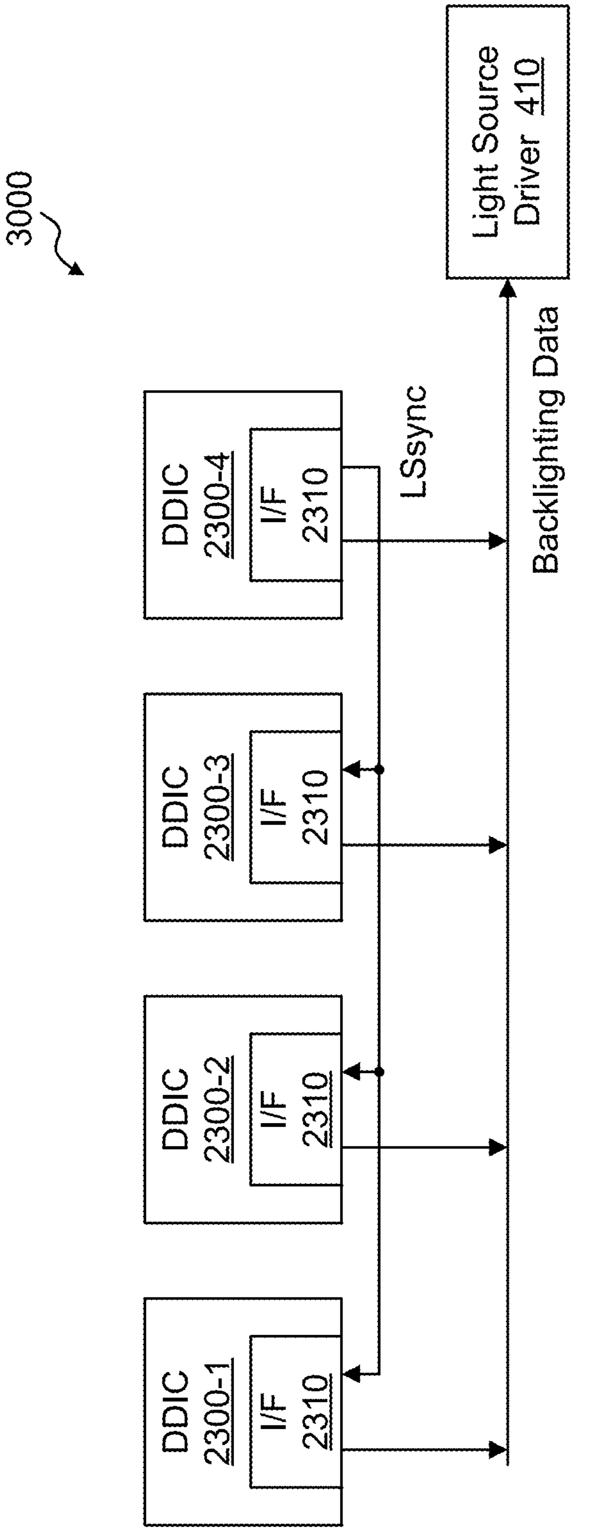
FIG. 14 shows an example configuration of a display device, according to other embodiments.

FIG. 14 shows an example configuration of a display device 3000, according to other embodiments. In the shown embodiment, the DDIC 2300-4, operating as the master DDIC, is configured to provide the backlighting data synchronization signal LSsync directly to the DDICs 2300-1, 2300-2, and 2300-3, and the DDICs 2300-1 to 2300-4 are configured to provide the backlighting data directly to the light source driver 410. The scheme described above for transferring the backlighting data to the light source driver 410 may be used with the configuration shown in FIG. 14.

Figure 15:
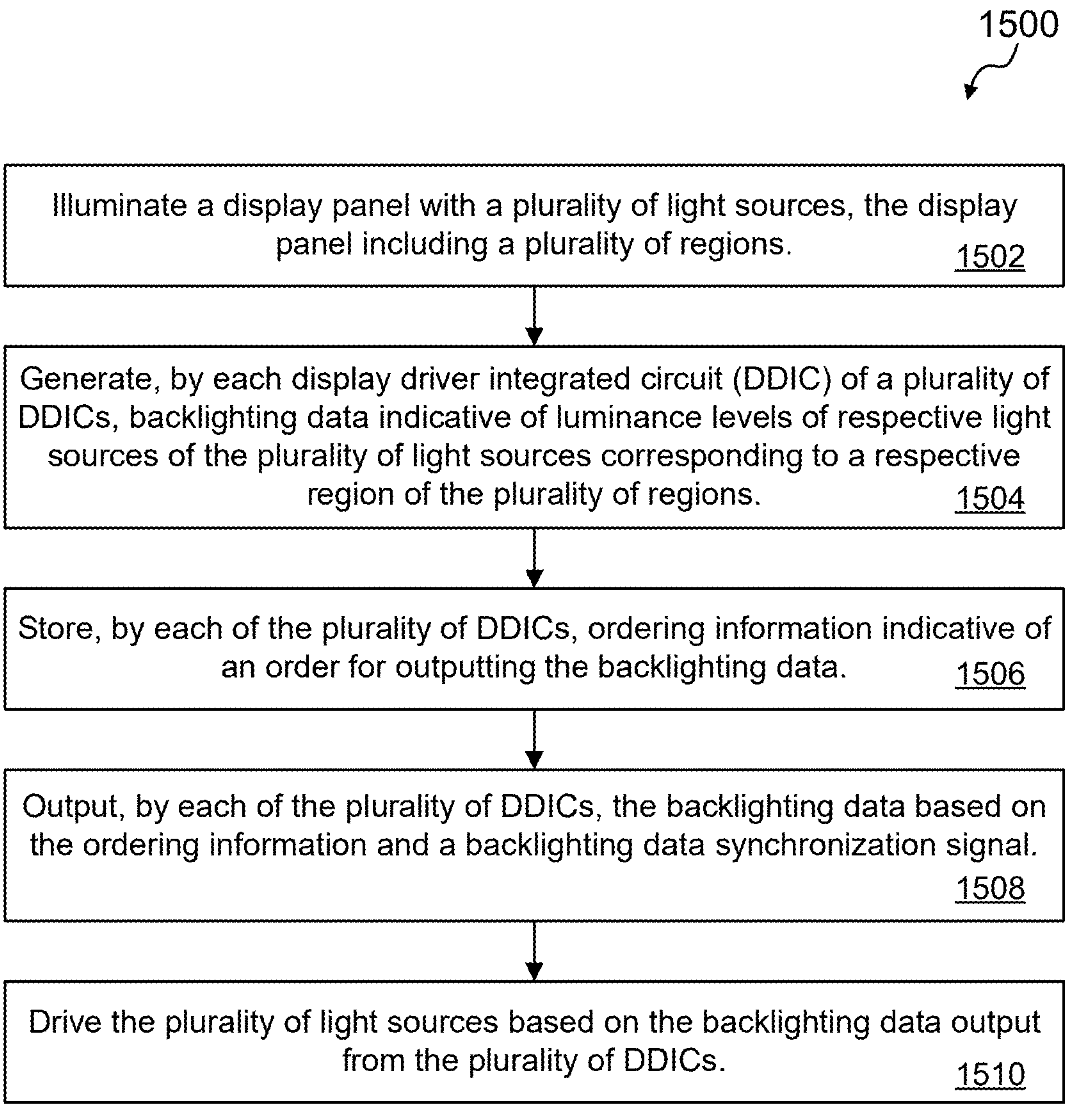
FIG. 15 is a flowchart showing an exemplary process for operating a display device, according to one or more embodiments.

FIG. 15 is a flowchart showing an exemplary process 1500 for operating a display device, according to one or more embodiments. The process 1500 may be performed by any of the display devices 1000, 2000, and 3000 shown in FIGS. 2, 5, 6, 10, 11, and 14. However, it will be recognized that a display device that includes additional and/or fewer components as shown in FIGS. 2, 5, 6, 10, 11, and 14 may be used to perform the process 1500, that any of the following steps may be performed in any suitable order, and that the process 1500 may be performed in any suitable environment.

The process 1500 includes illuminating a display panel (e.g., the display panel 200 shown in FIGS. 2, 4, and 9) with a plurality of light sources (e.g., the light sources 420 shown in FIG. 2) in step 1502. The display panel includes a plurality of regions (e.g., the regions 220-1 to 220-4 shown in FIGS. 2 and 3A).

The process 1500 further includes generating, by each display driver integrated circuit (DDIC) of a plurality of DDICs (e.g., the DDICs 300-1 to 300-4 shown in FIGS. 2, 4, 5, and the DDICs 1300-1 to 1300-4 shown in FIGS. 9 and 10), backlighting data indicative of luminance levels of respective light sources of the plurality of light sources corresponding to a respective region of the plurality of regions in step 1504.

The process 1500 further includes storing, by each of the plurality of DDICs, ordering information indicative of an order for outputting the backlighting data in step 1506. The process 1500 further includes outputting, by each of the plurality of DDICs, the backlighting data based on the ordering information and a backlighting data synchronization signal (e.g., the backlighting data synchronization signal LSsync shown in FIGS. 2 and 4 to 12) in step 1508. The process 1500 further includes driving the plurality of light sources based on the backlighting data output from the plurality of DDICs in step 1510.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by the context. The terms "comprising," "having," "including," and "containing" are to be construed as open-ended terms (i.e., meaning "including, but not limited to,") unless otherwise noted. The recitation of ranges of values herein is intended only as a shorthand method of referring individually to each separate value falling within the range, unless otherwise indicated herein, and each separate value is incorporated in the specification as if it were individually recited herein. All of the methods described herein can be performed in any suitable order unless otherwise indicated herein or otherwise clearly contradicted by the context. The use of any and all examples, or exemplary language (e.g., "such as") provided herein, is intended merely to better illuminate the invention and does not pose a limitation on the scope of the invention unless otherwise claimed. No language in the specification should be construed as indicating that a non-claimed element is essential to the practice of the invention.

Exemplary embodiments are described herein. Variations of these exemplary embodiments may become apparent to those of ordinary skill in the art upon reading the foregoing description. The inventors expect that skilled artisans to employ such variations as appropriate, and the inventors intend that the invention may be practiced in other ways than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by the context.

The invention claimed is:

1. A display device, comprising:

a plurality of light sources configured to illuminate a display panel comprising a plurality of regions;

a plurality of display driver integrated circuits (DDICs), wherein each of the plurality of DDICs is configured to:

generate backlighting data for a respective region of the plurality of regions, wherein the backlighting data is indicative of luminance levels of respective light sources, of the plurality of light sources, which correspond to the respective region, store ordering information indicative of an order for outputting the backlighting data for the respective region, wherein the ordering information comprises sequence numbers associated with respective light sources, wherein a respective sequence number for a respective light source specifies the order in which the backlighting data associated with the respective light source is to be transferred to a light source driver, and output the backlighting data for the respective region based on the ordering information and a backlighting data synchronization signal; and the light source driver, wherein the light source driver is configured to drive the plurality of light sources based on the backlighting data for the plurality of regions output from the plurality of DDICs;

wherein each of the plurality of DDICs comprises:

an ordering information memory configured to store the sequence numbers for the respective light sources; and an address memory configured to store addresses of the sequence numbers in the ordering information memory, and wherein each of the plurality of DDICs is configured to use the stored addresses stored in the address memory to retrieve the sequence numbers from the ordering information memory.

2. The display device of claim 1, wherein outputting the backlighting data based on the ordering information comprises outputting the backlighting data for a first light source in response to matching of a count of assertions of the backlighting data synchronization signal with a first sequence number associated with the first light source.

3. The display device of claim 1, wherein the plurality of DDICs are coupled in series to transfer the backlighting data generated by the plurality of DDICs to the light source driver.

4. The display device of claim 1, wherein generating the backlighting data is based on image data for the respective region of the plurality of regions of the display panel.

5. The display device of claim 4, further comprising a host configured to provide each of the plurality of DDICs with the image data for a respective region of the plurality of regions such that the image data provided to one of the plurality of DDICs is not provided to a remainder of the plurality of DDICs.

6. The display device of claim 1, wherein the address memory is further configured to output a selected address of the stored addresses, wherein the ordering information memory is further configured to output a selected sequence number of the sequence numbers indicated by the selected address of the stored addresses, and wherein outputting the backlighting data based on the ordering information comprises outputting the backlighting data for a first light source in response to matching of a count of assertions of the backlighting data synchronization signal with the selected sequence number.

7. The display device of claim 6, wherein each of the plurality of DDICs is further configured to update the selected address output from the address memory in response to the matching.

8. The display device of claim 1, wherein a first slave DDIC of the plurality of DDICs is configured to send the backlighting data generated by the first slave DDIC to the light source driver via a master DDIC of the plurality of DDICs.

9. The display device of claim 8, wherein a second slave DDIC of the plurality of DDICs is configured to send the backlighting data generated by the second slave DDIC to the light source driver via the first slave DDIC and the master DDIC.

10. A display driver integrated circuit, comprising:

a drive circuit configured to drive a region of a display panel having a plurality of regions;

a local dimming processing circuit configured to generate backlighting data for the region of the display panel, wherein the backlighting data is indicative of luminance levels of respective light sources corresponding to the region of the display panel; and a backlighting data transfer circuit configured to:

store ordering information indicative of an order for outputting the backlighting data, wherein the ordering information comprises sequence numbers associated with respective light sources, wherein a respective sequence number for a respective light source specifies the order in which the backlighting data associated with the respective light source is to be transferred to a light source driver, receive a backlighting data synchronization signal from an entity external to the display driver integrated circuit, and output the backlighting data based on the ordering information and the backlighting data synchronization signal to control the luminance levels of the respective light sources;

wherein the backlighting data transfer circuit further comprises:

an ordering information memory configured to store the sequence numbers for the respective light sources; and an address memory configured to store addresses of the sequence numbers in the ordering information memory, and wherein the backlighting data transfer circuit is configured to use the stored addresses stored in the address memory to retrieve the sequence numbers from the ordering information memory.

11. The display driver integrated circuit of claim 10, wherein generating the backlighting data is based on image data for the region of the display panel.

12. The display driver integrated circuit of claim 10, wherein outputting the backlighting data based on the ordering information comprises outputting the backlighting data for a first light source in response to matching of a count of assertions of the backlighting data synchronization signal with a first sequence number associated with the first light source.

13. The display driver integrated circuit of claim 10, wherein the address memory is further configured to output a selected address of the stored addresses, wherein the ordering information memory is further configured to output a selected sequence number of the sequence numbers indicated by the selected address of the stored addresses, and wherein outputting the backlighting data based on the ordering information comprises outputting the backlighting data for a first light source in response to matching of a count of assertions of the backlighting data synchronization signal with the selected sequence number.

14. A method, comprising:

illuminating a display panel with a plurality of light sources, the display panel comprising a plurality of regions;

generating, by each display driver integrated circuit (DDIC) of a plurality of DDICs, backlighting data for a respective region of the plurality of regions, wherein the backlighting data for the respective region is indicative of luminance levels of respective light sources, of the plurality of light sources, which correspond to the respective region;

storing, by each of the plurality of DDICs, ordering information indicative of an order for outputting the backlighting data generated by the respective DDIC, wherein the ordering information comprises sequence numbers associated with respective light sources, wherein a respective sequence number for a respective light source specifies the order in which the backlighting data associated with the respective light source is to be transferred to a light source driver;

outputting, by each of the plurality of DDICs, the backlighting data generated by the respective DDIC based on the ordering information and a backlighting data synchronization signal; and driving the plurality of light sources based on the backlighting data for the plurality of regions output from the plurality of DDICs:

wherein the method further comprises:

storing the sequence numbers for the respective light sources in an ordering information memory of each of the plurality of DDICs;

storing, by an address memory of each of the plurality of DDICs, addresses of the sequence numbers in the ordering information memory; and retrieving the sequence numbers from the ordering information memory using the stored addresses in each of the plurality of DDICs.

15. The method of claim 14, wherein generating the backlighting data for a respective region is based on image data for the respective region.

16. The method of claim 14, wherein outputting the backlighting data based on the ordering information comprises outputting the backlighting data for a first light source in response to matching a count of assertions of the backlighting data synchronization signal with a first sequence number associated with the first light source.

17. The method of claim 14, further comprising:

outputting, by the address memory, a selected address of the stored addresses from the address memory; and outputting, by the ordering information memory, a selected sequence number of the sequence numbers indicated by the selected address of the stored addresses from the ordering information memory, wherein outputting the backlighting data based on the ordering information comprises outputting the backlighting data for a first light source in response to matching of a count of assertions of the backlighting data synchronization signal with the selected sequence number.

* * * * *